(12) United States Patent
Lee et al.

(10) Patent No.: US 10,290,205 B2
(45) Date of Patent: May 14, 2019

(54) METHOD OF CONTROLLING FUNCTION AND ELECTRONIC DEVICE SUPPORTING SAME

(71) Applicant: Samsung Electronics Co., Ltd, Gyeonggi-do (KR)

(72) Inventors: Hye-Jin Lee, Gyeonggi-do (KR); Yoonsu Kim, Seoul (KR); Sahnghee Bahn, Gyeonggi-do (KR); Youngkyu Jin, Seoul (KR); Yeseul Ha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/409,441

(22) Filed: Jan. 18, 2017

(65) Prior Publication Data
US 2017/0206779 A1    Jul. 20, 2017

(30) Foreign Application Priority Data
Jan. 18, 2016 (KR) .................. 10-2016-0006002

(51) Int. Cl.
*G08C 17/02* (2006.01)
*G06F 3/0484* (2013.01)
(Continued)

(52) U.S. Cl.
CPC ......... *G08C 17/02* (2013.01); *G06F 3/04817* (2013.01); *G06F 3/04847* (2013.01);
(Continued)

(58) Field of Classification Search
None
See application file for complete search history.

(56) References Cited

U.S. PATENT DOCUMENTS 6,747,590 B1 * 6/2004 Weber ............... G08C 19/12
340/12.28
7,170,422 B2 * 1/2007 Nelson ............... G08C 19/28
340/10.32
(Continued)

FOREIGN PATENT DOCUMENTS

EP    3038427 A1    6/2016
JP    2002016984    1/2002
(Continued)

*Primary Examiner* — K. Wong

(57) ABSTRACT

A method of controlling a function by an electronic device is provided. The method including: receiving first control information for controlling a function of at least one first external device, from the at least one first external device connected in communication using a communication interface; executing, by the electronic device, an application that provides at least one function; determining, from the at least one first external device, information associated with at least one second external device that provides a function corresponding to the at least one function of the application, and determining, from the first control information, second control information for controlling the corresponding function of the at least one second external device; and controlling, by the electronic device, the corresponding function of the at least one second external device at least based on the determined second control information.

20 Claims, 18 Drawing Sheets

(51) Int. Cl.
*G06F 3/14* (2006.01)
*G06F 3/0481* (2013.01)
*H04W 4/80* (2018.01)

(52) U.S. Cl.
CPC .............. *G06F 3/14* (2013.01); *G06F 3/0481* (2013.01); *G08C 2201/30* (2013.01); *G08C 2201/92* (2013.01); *G08C 2201/93* (2013.01); *G09G 2370/16* (2013.01); *H04W 4/80* (2018.02)

(56) References Cited

U.S. PATENT DOCUMENTS

| | | | |
|---|---|---|---|
| 7,688,391 B2* | 3/2010 | Sato | H04N 5/4401 340/12.53 |
| 9,413,820 B2* | 8/2016 | Chang | G06F 3/1454 |
| 9,590,427 B2* | 3/2017 | Davis | H05B 37/0272 |
| 9,609,462 B2* | 3/2017 | Warren | H04W 4/70 |
| 2013/0198638 A1 | 8/2013 | Na et al. | |
| 2014/0079247 A1 | 3/2014 | Sanders | |
| 2014/0167929 A1* | 6/2014 | Shim | G08C 17/02 340/12.5 |

FOREIGN PATENT DOCUMENTS

| | | |
|---|---|---|
| KR | 20150045206 | 4/2015 |
| KR | 20140147059 | 12/2015 |

\* cited by examiner

```
{device type : "",
    {properties :
610─┐
        611──{supporConnectivity : ""},        //  (BT/WiFi/WiFi-Direct)
        612──{hasDisplay : ""},                //  (yes/no)
        613──{hasSpeaker : ""},                //  (yes/no)
        614──{hasLight : ""},                  //  (yes/no)
             {hasController : ""},             //  (yes/no)
        620──┘  {properties :
                   621──{powerControl : ""},   //(on/off)
                   623──{mediaControl : ""},   //(yes/no)
                        630──{hasOwnData : ""},        //(yes/no)
                             631──{singleMediaControl : ""},  //yes/no)
                                  {supportDataTypes : ""}
                             632──{multiMediaControl : ""},   // (yes/no)
                   640──{temperatureControl : ""},    //(yes/no)
                        641──{controlType : ""},      //(air/fridge)
                        643──{isCelsius : ""},        //(yes/no)
                   650──{brightnessControl : ""},     //(yes/no)
                        651──{supportColorCode : ""}, //(HTML/RGB/HEX)
        660──┐   }
             {supportExtraControl : ""},   // (yes/no)
        }
    }
}
```

FIG.6

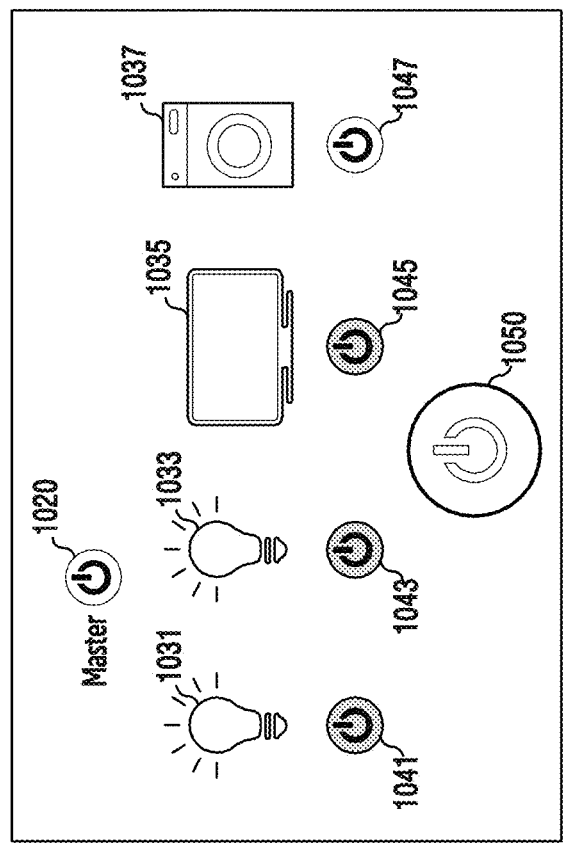
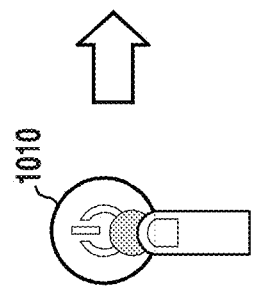
FIG.10B
FIG.10A

METHOD OF CONTROLLING FUNCTION AND ELECTRONIC DEVICE SUPPORTING SAME

CROSS-REFERENCE TO RELATED APPLICATION(S) AND CLAIM OF PRIORITY

The present application is related to and claims the priority under 35 U.S.C. § 119(a) to Korean Application Serial No. 10-2016-0006002, which was filed in the Korean Intellectual Property Office on Jan. 18, 2016, the entire content of which is hereby incorporated by reference.

TECHNICAL FIELD

The present disclosure relates to a method of controlling a function and an electronic device supporting the same.

BACKGROUND

As information communication technologies, semiconductor technologies or the like have been dramatically developed, electronic devices (e.g., mobile terminals) have been rapidly propagated and widely used. Electronic devices have refused to remain with their conventional functions, and have reached a level of convergence of embracing areas of other devices. For example, an electronic device provides a user with various functions using applications, such as a timer function, a file transmission function, a music playback function, a video playback function, or the like, in addition to a call function.

Recently, a technology for controlling the functions of various devices around an electronic device by using the electronic device has been developed. For example, the electronic device may generally control the functions of devices located in a house, such as a TV, speakers, a refrigerator, and a washing machine, or the like, through a home network.

SUMMARY

However, according to the conventional technology, an electronic device should use an application, a software development kit (SDK), or the like provided by a manufacturer of each of the neighboring devices, in order to control each function of the neighboring devices, which is inconvenient.

Various embodiments of the present disclosure relate to a method of controlling a function and an electronic device supporting the same, which can control a neighboring device that provides a function that is in common with at least one function of an application when the application is executed.

To address the above-discussed deficiencies, it is a primary object to provide a method of controlling a function by an electronic device, the method including: receiving first control information for controlling a function of at least one first external device, from the at least one first external device connected in communication using a communication interface; executing, by the electronic device, an application that provides at least one function; determining, from the at least one first external device, information associated with at least one second external device that provides a function corresponding to the at least one function of the application, and determining, from the first control information, second control information for controlling the corresponding function of the at least one second external device; and controlling, by the electronic device, the corresponding function of the at least one second external device at least based on the determined second control information.

According to various embodiments of the present disclosure, there is provided an electronic device, including: a communication interface; and a processor, wherein the processor is configured to perform: receiving first control information for controlling a function of at least one first external device from the at least one first external device connected in communication using the communication interface; executing an application that provides at least one function; and determining, from the at least one first external device, information associated with at least one second external device that provides a function corresponding to the at least one function of the application, determining, from the first control information, second control information for controlling the corresponding function of the at least one second external device, and controlling, by the electronic device, the corresponding function of the at least one second external device at least based on the determined second control information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6 to 7C illustrate a method of controlling a function according to an embodiment of the present disclosure;

FIGS. 9A to 13B illustrate a method in which an electronic device controls at least one function of an external device at least based on control information of the external device according to an embodiment of the present disclosure;

DETAILED DESCRIPTION

Figure 1:
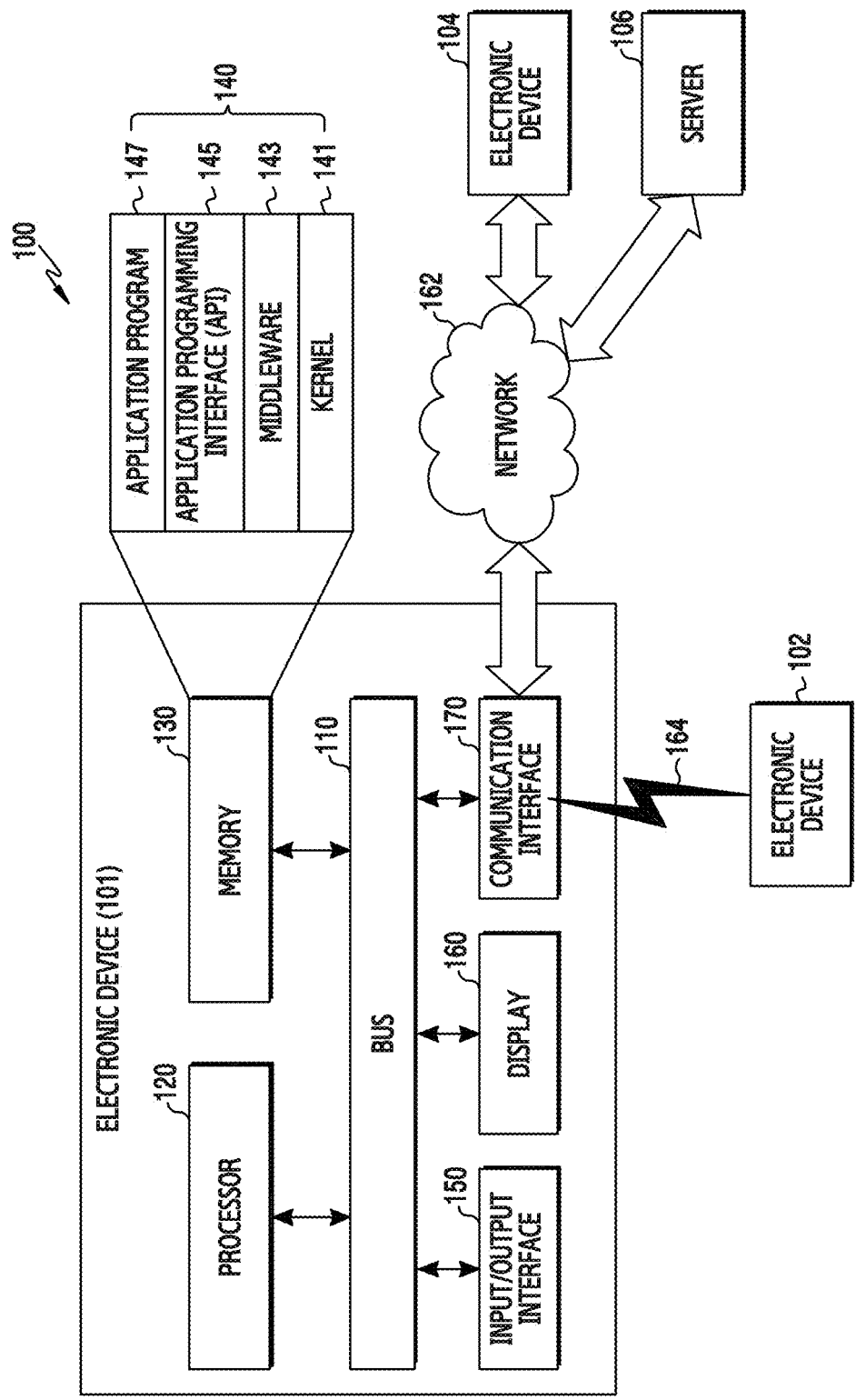
FIG. 1 illustrates a network environment including an electronic device according to various embodiments of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and Play Station™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a Magnetic Resonance Imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include one or more of a central processing unit (CPU), an application processor (AP), and a communication processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a liquid crystal display (LCD), a Light emitting diode (LED) display, an organic light emitting diode (OLED) display, a micro electro mechanical system (MEMS) display, or an electronic paper display. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, long term evolution (LTE), LTE-Advance (LTE-A), code division multiple access (CDMA), wideband CDMA (WCDMA), universal mobile telecommunications system (UMTS), WiBro (Wireless Broadband), and global system for mobile communications (GSM), as a cellular communication protocol. In addition, the wireless communication may include, for example, short range communication 164. The short-range communication 164 may be performed by using at least one of, for example, Wi-Fi, Bluetooth, Bluetooth low energy (BLE), near field communication (NFC), and global navigation satellite system (GNSS). The GNSS may include at least one of, for example, a global positioning system (GPS), a global navigation satellite system (Glonass), a Beidou navigation satellite system (hereinafter referred to as "Beidou"), and a european global satellite-based navigation system (Galileo), according to a use area, a bandwidth, or the like. Hereinafter, in the present disclosure, the "GPS" may be interchangeably used with the "GNSS". The wired communication may include at least one of, for example, a universal serial bus (USB), a high definition multimedia interface (HDMI), recommended standard 232 (RS-232), and a plain old telephone service (POTS). The network 162 may include at least one of a communication network such as a computer network (e.g., a LAN or a WAN), the Internet, and a telephone network.

Each of the first and second external electronic apparatuses 102 and 104 may be of a type identical to or different from that of the electronic apparatus 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic apparatus 101. The electronic device 101 may process the received result as it is or additionally to provide the requested functions or services. To achieve this, for example, cloud computing, distributed computing, or client-server computing technology may be used.

Figure 2:
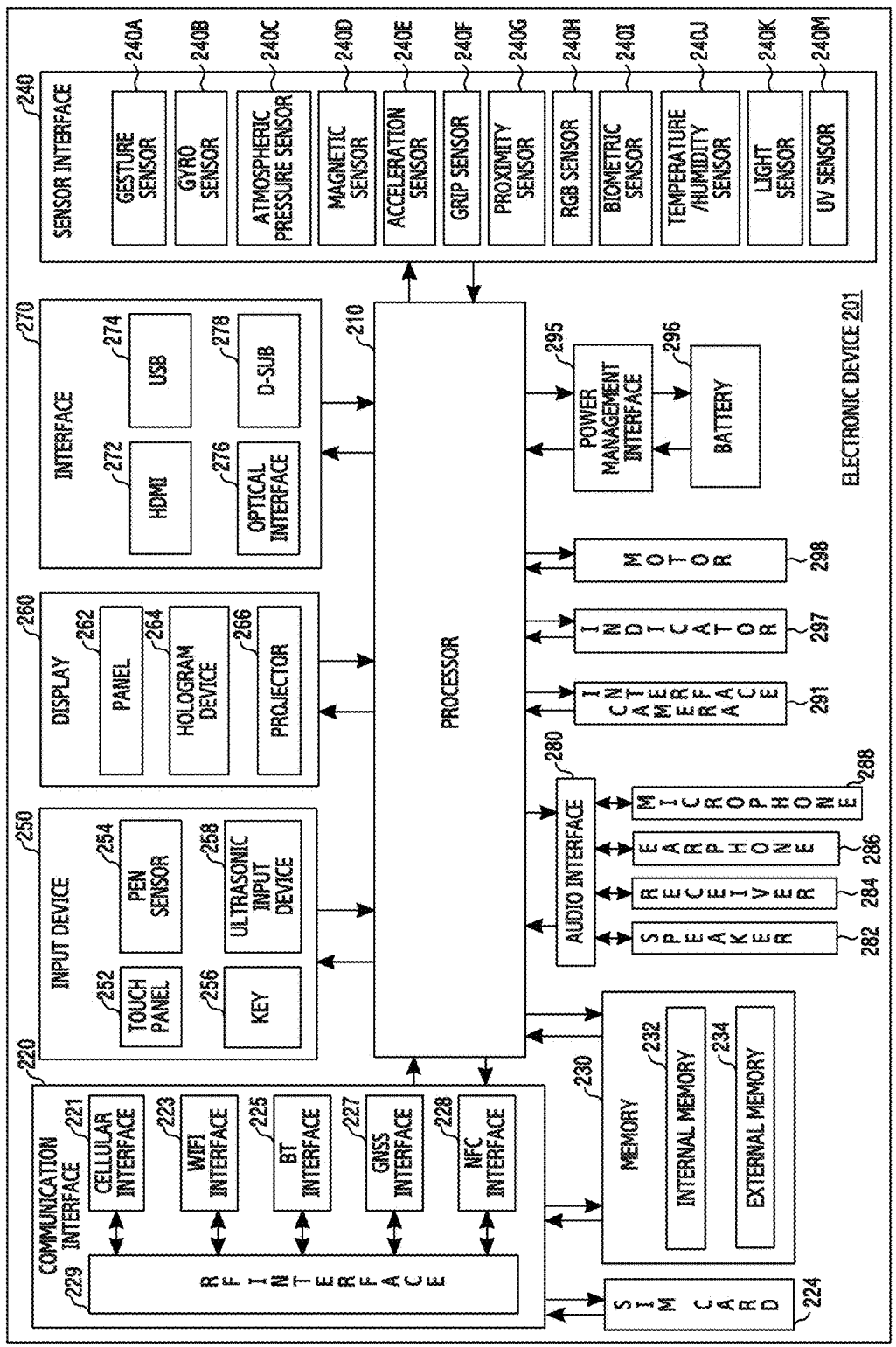
FIG. 2 illustrates an electronic device according to various embodiments of the present disclosure.

FIG. 2 illustrates an electronic device according to various embodiments of the present disclosure.

FIG. 2 illustrates an electronic device 201 according to various embodiments. For example, the electronic apparatus 201 may include the whole or part of the electronic apparatus 101 illustrated in FIG. 1. The electronic device 201 may include at least one processor (e.g., Application Processor (AP)) 210, a communication interface 220, a Subscriber Identification Module (SIM) 224, a memory 230, a sensor 240, an input device 250, a display 260, an interface 270, an audio 280, a camera 291, a power management 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a system on chip (SoC). According to an embodiment, the processor 210 may further include a graphic processing unit (GPU) and/or an image signal processor. The processor 210 may include at least some (e.g., a cellular interface 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication interface 220 may have a configuration equal or similar to that of the communication interface 170 of FIG. 1. The communication interface 220 may include, for example, the cellular interface 221, a Wi-Fi interface 223, a Bluetooth (BT) module 225, a Bluetooth low energy module 226, a GNSS interface 227 (e.g., a GPS module, a Glonass module, a Beidou module, or a Galileo module), an NFC interface 228, and a radio frequency (RF) module 229.

The cellular interface 221 may provide a voice call, image call, a text message service, or an Internet service through, for example, a communication network. According to an embodiment, the cellular interface 221 may distinguish between and authenticate electronic devices 201 within a communication network using a subscriber identification module (for example, the SIM card 224). According to an embodiment of the present disclosure, the cellular interface 221 may perform at least some of the functions that the processor 210 may provide. According to an embodiment, the cellular interface 221 may include a Communication Processor (CP).

Each of the Wi-Fi interface 223, the BT interface 225, the Bluetooth low energy module 226, the GNSS interface 227, and the NFC interface 228 may include, for example, a processor for processing data transmitted and received through the relevant module. According to some embodiments of the present disclosure, at least some (e.g., two or more) of the cellular interface 221, the Wi-Fi interface 223, the BT interface 225, the GNSS interface 227, and the NFC interface 228 may be included in one integrated chip (IC) or IC package.

The RF 229 may transmit/receive, for example, a communication signal (for example, an RF signal). The RF 229 may include, for example, a transceiver, a power amplifier module (PAM), a frequency filter, a low noise amplifier (LNA), and an antenna. According to another embodiment of the present disclosure, at least one of the cellular interface 221, the Wi-Fi interface 223, the BT interface 225, the Bluetooth low energy module 226, the GNSS interface 227, and the NFC interface 228 may transmit and receive RF signals through a separate RF.

The subscriber identification module 224 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 (for example, the memory 130) may include, for example, an internal memory 232 or an external memory 234. The embedded memory 232 may include at least one of a volatile memory (for example, a dynamic random access memory (DRAM), a static RAM (SRAM), a Synchronous Dynamic RAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard disc drive, a solid state drive (SSD), and the like).

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected to the electronic apparatus 201 through various interfaces.

The sensor 240 may measure a physical quantity or detect an operation state of the electronic device 201, and may convert the measured or detected information into an electrical signal. For example, the sensor 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red/green/blue (RGB) sensor), a bio-sensor 240I, a temperature/humidity sensor 240J, a light sensor 240K, and an ultra violet (UV) sensor 240M. Additionally or alternatively, the sensor 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor 240 may further include a control circuit for controlling one or more sensors included therein. In some embodiments of the present disclosure, the electronic apparatus 201 may further include a processor configured to control the sensor 240 as a part of or separately from the processor 210, and may control the sensor 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic apparatus 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio 280 may bilaterally convert, for example, a sound and an electrical signal. At least some elements of the audio 280 may be included in, for example, the input/output interface 145 illustrated in FIG. 1. The audio 280 may process sound information which is input or output through, for example, a speaker 282, a receiver 284, earphones 286, the microphone 288 or the like.

The camera 291 is a device which may photograph a still image and a dynamic image. According to an embodiment, the camera 291 may include one or more image sensors (for example, a front sensor or a back sensor), a lens, an image signal processor (ISP) or a flash (for example, LED or xenon lamp).

The power management 295 may manage, for example, power of the electronic device 201. According to an embodiment, the power management 295 may include a power management integrated circuit (PMIC), a charger integrated circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic apparatus 201 or a part (e.g., the processor 210). The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may, for example, process media data according to a certain standard such as digital multi-media broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
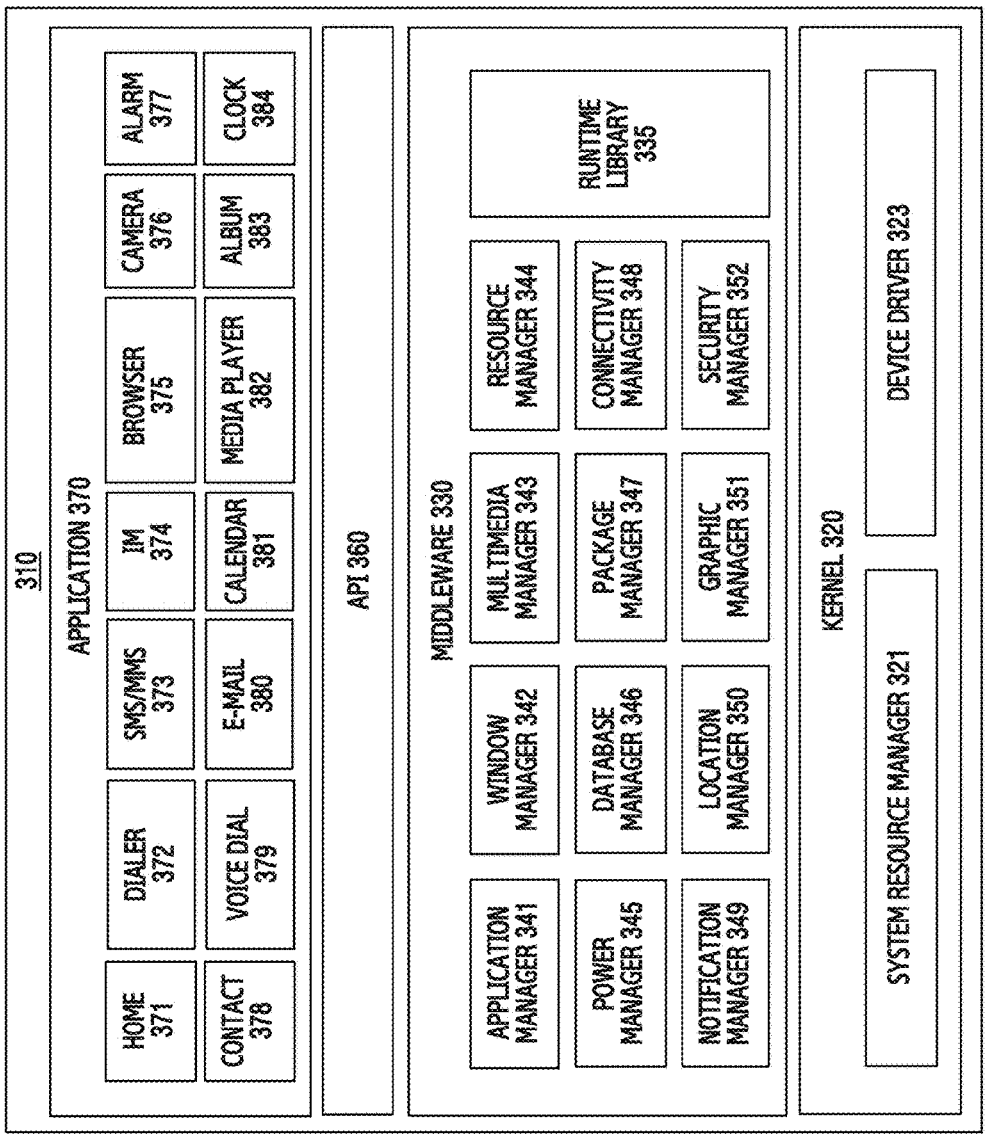
FIG. 3 illustrates a program module according to various embodiments of the present disclosure.

FIG. 3 illustrates a program module according to various embodiments of the present disclosure.

According to an embodiment, the program module 310 (for example, the program 140) may include an operating system (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a basic input/output system (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic apparatus (e.g., the electronic apparatus 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic apparatus (e.g., the electronic apparatus 101) and an external electronic apparatus (e.g., the electronic apparatus 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic apparatus 102 or 104), notification information generated by other applications (e.g., an SMS/MMS application, an email application, a health care application, an environmental information application, etc.) of the electronic apparatus 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic apparatus (e.g., the server 106, or the electronic apparatus 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module' may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

The module or the program module, according to various embodiments, may: include one or more elements described above; exclude some of them; or further include other elements. The operations performed by the module, the program module, or other elements, according to various embodiments, may be executed in a sequential, parallel, iterative, or heuristic method. In addition, some operations may be executed in a different order, or may be omitted, or other operations may be added. In addition, the embodiments disclosed in the present document are intended for the explanation and understanding of the technical matter, and shall not limit the scope of the technology described in the present document. Accordingly, the scope of the present disclosure should be construed to encompass all modifications or various other embodiments based on the technical concept of the present disclosure.

In addition, the embodiments disclosed in the present document are intended for the explanation and understanding of the disclosed technical matter, and shall not limit the scope of various embodiments of the present document. Therefore, the scope of various embodiments of the present document should be construed to encompass all modifications or various other embodiments based on the technical concept of the various embodiments of the present disclosure.

An electronic device according to various embodiments of the present disclosure may include a communication interface and a processor, wherein the processor may perform: receiving first control information for controlling a function of at least one first external device from the at least one first external device connected in communication using the communication interface; executing an application that provides at least one function; and determining, from the at least one first external device, information associated with at least one second external device that provides a function corresponding to the at least one function of the application, determining, from the first control information, second control information for controlling the corresponding function of the at least one second external device, and controlling, by the electronic device, the corresponding function of the at least one second external device at least based on the determined second control information.

According to an embodiment, the function corresponding to the at least one function of the application may include: a function of the at least one second external device, which is the same as the at least one function of the application, or a function that the at least one second external device has in common with the at least one function of the application.

According to an embodiment, the processor may perform: searching for at least one third external device that is capable of being additionally connected when the application is executed using the communication interface; and receiving, from the at least one third external device, control information for controlling the at least one third external device when a communication connection with the at least one third external device is established.

According to an embodiment, the electronic device may further include a display, and the processor may control the display to display an object mapped to each of the at least one function of the application, and to display an indication indicating that the at least one second external device and the corresponding function of the at least one second external device exist for each object mapped to each of the at least one function of the application.

According to an embodiment, the processor may control the display to additionally display the number of the at least one second external devices.

According to an embodiment, the electronic device may further include a user interface for receiving a designated input for controlling the corresponding function of the at least one second external device with respect to the mapped object, and controlling the corresponding function of the at least one second external device when the designated input is received.

According to an embodiment, the user interface for controlling the corresponding function of the at least one second external device may include at least one out of: an object for controlling a function of the electronic device, an object for separately controlling the corresponding function of the at least one second external device, and an object for uniformly controlling the corresponding function of the at least one second external device.

According to an embodiment, the user interface for controlling the corresponding function of the at least one second external device may include: an object displayed in the shape of a toggle, an object displayed in the shape of a slider bar, or an input box, according to an attribute of the corresponding function.

According to an embodiment, the at least one function may include at least one of a power control function, a volume control function, a brightness control function, an illumination control function, a temperature control function, and a music playback function.

According to an embodiment, the processor may restore a control state of the corresponding function of the at least one second external device to a control state before the establishment of the communication connection when the communication connection with the at least one second external device is disconnected.

Figure 4:
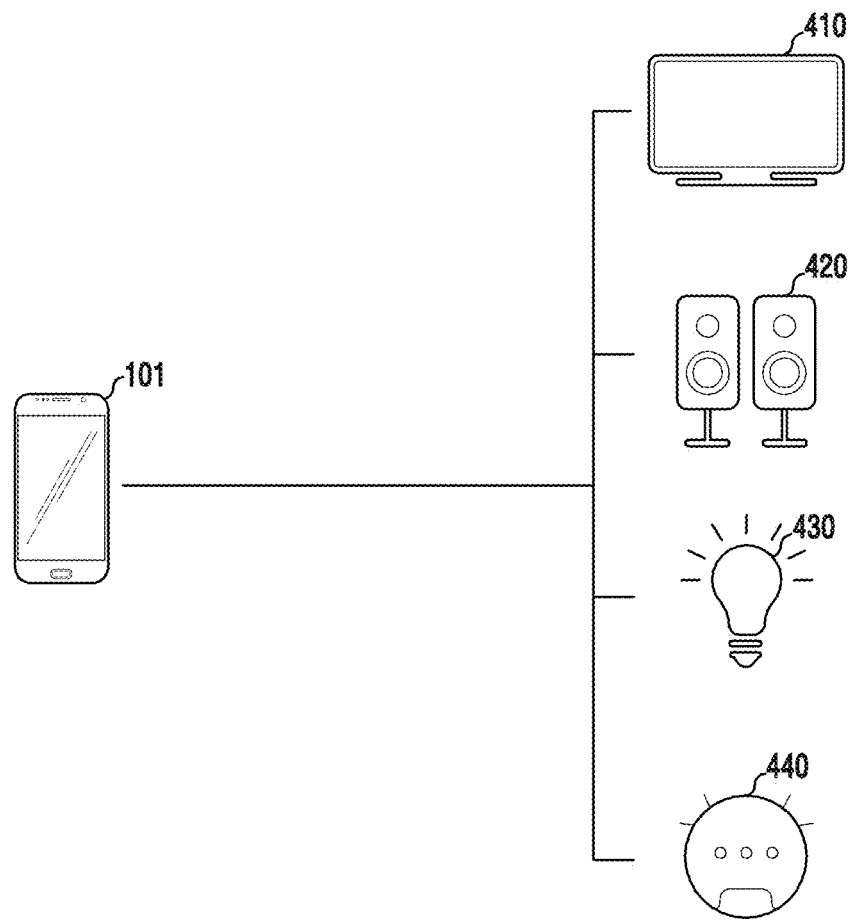
FIG. 4 illustrates a method of controlling a function according to various embodiments of the present disclosure.

FIG. 4 illustrates a method of controlling a function according to various embodiments of the present disclosure.

Referring to FIG. 4, in an embodiment, the electronic device 101 may receive information for controlling a function of at least one external device from the at least one external device that is connected in communication.

According to an embodiment, the electronic device 101 may be connected in communication with at least one external device using various communication schemes. For example, the electronic device 101 may be connected in communication with at least one external device using wired or wireless communication. For example, the electronic device 101 may be connected in communication with at least one external device using a peer to peer (P2P) communication interface, such as Bluetooth, wi-fi direct, near field communication (NFC), or the like, in addition to a short-range communication interface including a wireless local area network (WLAN) (e.g., wi-fi) or the like. In this instance, a communication connection scheme with the at least one external device may not be limited thereto. For example, the electronic device 101 may connect communication with at least one external device using various communication schemes, such as a cellular communication, a home network, or the like.

According to an embodiment, an external device that may connect communication with the electronic device 101 may include a device that is capable of performing various functions. For example, although FIG. 4 illustrates a television 410, a speaker 420, an illumination device 440, and a vacuum cleaner 430, or the like as an external device, the external device may not be limited thereto.

According to an embodiment, when the electronic device 101 connects communication with at least one external device, the electronic device 101 may receive control information (profile information or specification) for controlling at least one function of the at least one external device from the at least one external device. According to an embodiment, the control information for controlling the at least one function of the external device may include an external device name (or external device identification (ID)), information associated with a function performed in the external device, control information associated with a function performed by the external device, information associated with a current state of the external device, or the like. However, it may not be limited thereto.

According to an embodiment, when an application is executed in the electronic device 101 based on a user input, the electronic device 101 may determine (or search), from at least one external device connected in connection with the electronic device 101, at least one external device that provides a function corresponding to each of at least one function of the application, and may determine (or search), from function control information received from the at least one external device, function control information of the at least one external device for controlling a function corresponding to each of the at least one function of the application. For example, when a video application is executed in the electronic device 101, the electronic device 101 may determine the speaker 420 as a device that provides a volume control function corresponding to a volume control function of the video application, and control information for controlling a volume of the speaker 420. As another example, when a video application is executed in the electronic device 101, the electronic device 101 may determine the television 410 as a device that provides a screen output function corresponding to a screen output function of the video application, and control information for controlling the outputting of a screen of the television 410. As another example, when an application for controlling a screen brightness control function is executed in the electronic device 101, the electronic device 101 may determine the illumination device 430 as a device that provides an illumination control function corresponding to the screen brightness control function, and control information for controlling the illumination of the illumination device 430. As another example, when an application for providing a power control function (or a power on/off function) is executed in the electronic device 101, the electronic device 101 may determine the vacuum cleaner 440 providing a power control function corresponding (or identical) to the power control function, and may determine control information for controlling the power control function of the vacuum cleaner 440. In an embodiment, although FIG. 4 illustrates a single external device that provides a function corresponding to a single function of an application and a single piece of control information of the external device, the present disclosure may not be limited thereto. For example, when an application is executed in the electronic device 101, the electronic device 101 may determine a plurality of external devices that provide a function corresponding to at least one function of the application, and a plurality of pieces of control information of the plurality of external devices.

According to an embodiment, at least based on the determined control information, the electronic device 101 may enable a function corresponding (or identical) to at least one function of an application executed in the electronic device 101 to be controlled in at least one external device. According to an embodiment, the electronic device 101 may display a user interface (UI) for controlling a function of an external device corresponding to at least one function of an application, together with a UI for controlling the at least one function of the application executed in the electronic device 101. The electronic device 101 may control a function of an external device using a UI for controlling the function of the external device corresponding to at least one function of an application. For example, when a video application is executed in the electronic device 101, the electronic device 101 may display a UI for controlling a volume control function of the speaker 420, together with a UI for controlling a volume control function of the electronic device 101. The electronic device 101 may control the volume control function of the speaker 420 using the UI for controlling the volume control function of the speaker 420. However, the present disclosure may not be limited thereto.

As described above, when an application providing at least one function is executed, the electronic device 101 may control a function of an external device corresponding (or identical) to each of at least one function of the application using the executed application. Hereinafter, a function control method and the electronic device 101 supporting the same according to various embodiments of the present disclosure will be described in detail with reference to FIGS. 5 to 18.

Figure 5:
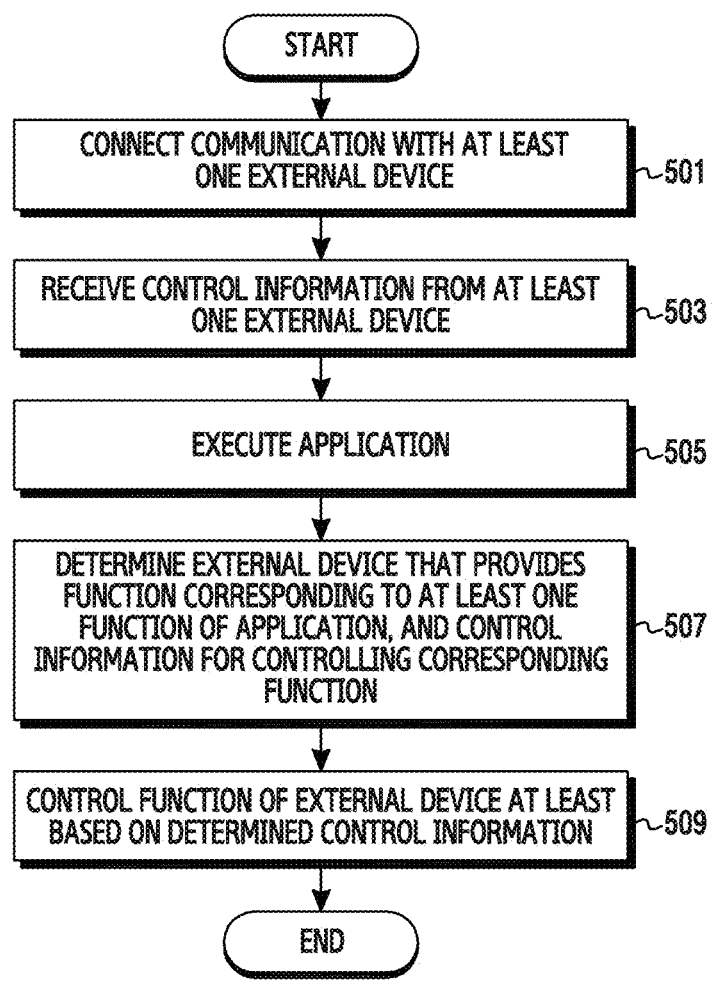
FIG. 5 illustrates a flowchart of a method of controlling a function according to an embodiment of the present disclosure.

FIG. 5 illustrates a flowchart of a method of controlling a function according to an embodiment of the present disclosure.

Figure 7A:
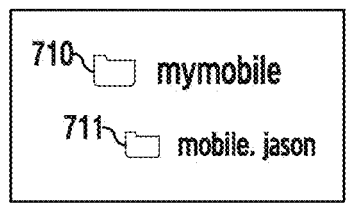
Figure 7B:
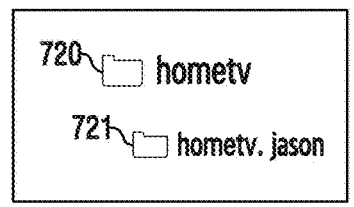
Figure 7C:
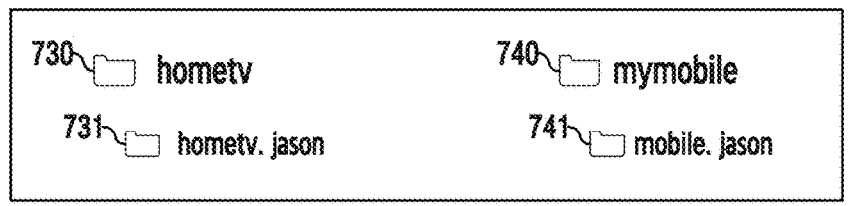

FIGS. 6 to 7C illustrate a method of controlling a function according to an embodiment of the present disclosure.

Referring to FIGS. 5 to 7C, in operation 501, the electronic device 101 connects communication with at least one external device.

According to an embodiment, the electronic device 101 may be connected in communication with at least one external device using various communication schemes. For example, the electronic device 101 may be connected in communication with at least one external device using wired or wireless communication. For example, the electronic device 101 may be connected in communication with at least one external device using a peer to peer (P2P) communication interface, such as Bluetooth, wi-fi direct, near field communication (NFC), or the like, in addition to a short-range communication interface including a wireless local area network (WLAN) (e.g., wi-fi) or the like. In this instance, a communication connection scheme with at least one external device may not be limited thereto. For example, the electronic device 101 may be connected in communication with at least one external device using various communication schemes, such as a cellular communication, a home network, or the like.

According to an embodiment, the electronic device 101 may automatically execute a communication connection with at least one external device when the electronic device 101 is located within a designated distance (or enters the range of a designated distance) from the at least one external device. According to another embodiment, when the electronic device 101 (e.g., the processor 120) is at least a designated distance distant away in the state in which the electronic device 101 is located in the range of the designated distance from at least one external device, the electronic device 101 may be disconnected in communication from the at least one external device. However, the present disclosure may not be limited thereto.

In operation 503, the electronic device 101 (e.g., the processor 120) receives control information (or profile information or specification) for controlling at least one function of the at least one external device from the at least one external device. According to an embodiment, control information (hereinafter, referred to as "first control information") for controlling at least one function of an external device may include an external device name (or external device identification (ID)), information associated with a function performed in an external device, control information associated with a function performed by an external device, information associated with a current state of an external device, or the like. However, the present disclosure may not be limited thereto.

For example, FIG. 6 illustrates first control information 601 received from an external device. According to an embodiment, the first control information 601 may include at least one out of: a title (or type) 610 of an external device, a connectable communication scheme 611 supported by an external device, information 612 indicating whether an external device includes a display, information 613 indicating whether an external device includes a speaker, information 614 indicating whether an external device outputs light, control information 620, and the like. According to an embodiment, the control information 620 may include at least one out of: information 621 indicating whether a power control function is provided, information 623 indicating whether a media control function is provided, information 630 indicating whether data of an external device itself is included when a media control function is provided, information indicating whether a single media control function 631 or a multi-media control function 632 is provided, information 640 indicating whether a temperature control function is provided, a control type 641 (air control type or fringe control type) and information 643 indicating whether temperature is provided when a temperature control function is provided, information 650 indicating whether a brightness control function is provided, a provided color code when a brightness control function is provided, information 651 associated with an additionally supportable control function, and the like. However, the above is merely an example, and the technical idea of the present disclosure may not be limited thereto. For example, the first control information 610 may further include additional control information 660 associated with a function controllable by the electronic device 101 (e.g., the processor 120) connected in communication.

According to an embodiment, operation 503 may further include a process of storing the received first control information. For example, FIGS. 7A to 7C are diagrams illustrating a method of storing (or sharing) control information between the electronic device 101 and an external device.

FIG. 7A illustrates an example in which the electronic device 101 stores control information associated with at least one function of the electronic device 101 before connecting communication with an external device (e.g., home television (hometv)). For example, the electronic device 101 may store, in a system, a folder 710 for storing control information associated with at least one function of the electronic device 101, and may store a file 711 for controlling the at least one function of the electronic device 101.

FIG. 7B illustrates an example in which an external device (e.g., a home television (hometv)) stores control information associated with at least one function of the external device before connecting communication with the electronic device 101. For example, the external device may store, in a system, a folder 720 for storing control information associated with at least one function of the external device, and may store a file 721 for controlling the at least one function of the external device.

FIG. 7C illustrates an example in which the electronic device 101 and an external device are connected in communication, the electronic device 101 and the external device exchange (or share) control information therebetween, and the electronic device 101 and the external device may store the control information. For example, the electronic device 101 may additionally generate and store a folder 740 for storing control information associated with at least one function of the external device, and may additionally generate and store a file 741 for controlling the at least one function of the external device. The external device may additionally generate and store a folder 730 for storing control information associated with at least one function of the electronic device 101, and may additionally generate and store a file 731 for controlling the at least one function of the electronic device 101.

Although FIG. 7C illustrates the file 731 for controlling the function of the electronic device 101 and the file 741 for controlling the function of the external device, the present disclosure may not be limited thereto. For example, the electronic device 101 and the external device may further store a file indicating a current state (or a current control state) of the electronic device 101 and a current state of the external device. According to an embodiment, when at least one of information associated with the current state of the electronic device 101 and information associated with the current state of the external device is updated, the electronic device 101 and the external device may update a folder 730 and 740 or a file according to the updating. However, the present disclosure may not be limited thereto.

In operation 505, the electronic device 101 (e.g., the processor 120) executes an application that provides at least one function. For example, the electronic device 101 (e.g., the processor 120) may execute a video application that provides a volume control function, a muting function, a screen brightness function, and the like. As another example, the electronic device 101 (e.g., the processor 120) may execute an application that provides a power control function (or a power on/off function). In this instance, an application or a function provided by an application may not be limited to the above mentioned example.

According to an embodiment, operation 505 that executes an application providing at least one function may further include an operation of additionally connecting communication with an external device, and an operation of receiving control information when the application is executed. For example, when an application is executed, the electronic device 101 (e.g., the processor 120) may search for an external device that is capable of being additionally connected in communication, and may connect communication with the retrieved external device. The electronic device 101 (e.g., the processor 120) may receive control information of the external device from the additionally connected external device. The electronic device 101 (e.g., the processor 120) may store control information received from the additionally connected external device.

According to another embodiment, operation 505 that executes an application that provides at least one function may further include an operation of receiving information to which a current state is reflected, for example, updated control information, from the connected external device, when the application is executed. For example, the electronic device 101 (e.g., the processor 120) may receive, from a previously connected external device when an application is executed, state information associated with the previously connected external device when the application is executed, and updated control information for controlling a function of the external device. However, the present disclosure may not be limited thereto.

When the application is executed in operation 505, the electronic device 101 (e.g., the processor 120) determines an external device that provides a function corresponding to at least one function of the executed application, and control information (hereinafter, referred to as "second control information") for controlling the function of the external device corresponding to the at least one function of the executed application in operation 507.

According to an embodiment, the electronic device 101 (e.g., the processor 120) may determine an external device that provides a function identical to a function of an executed application from among at least one external device connected in communication with the electronic device 101, and second control information of the external device. For example, when a music application is executed, the electronic device 101 (e.g., the processor 120) may determine a speaker that provides a volume control function that is the same as a function of the music application function (for example, a volume control function) and information for controlling the volume control function of the speaker. However, the present disclosure may not be limited thereto.

According to another embodiment, the electronic device 101 (e.g., the processor 120) may determine an external device that provides a function that is in common with (or that is of a type identical to) a function of an executed application from among at least one external device connected in communication with the electronic device 101, and second control information of the external device. For example, when an application for controlling the brightness of a screen is executed, the electronic device 101 (e.g., the processor 120) may determine an illumination device that provides an illumination brightness control function that is in common with a screen brightness control function from the perspective of controlling brightness, and may determine information for controlling the illumination brightness control function of the illumination device. However, the present disclosure may not be limited thereto.

According to an embodiment, examples of the same or common function between the electronic device 101 and an external device may be as shown in Table 1 provided below.

TABLE 1

|  | Mobile | Washing machine | Bulb | TV | Speaker | Robot cleaner | Refrigerator | Air conditioner |
|---|---|---|---|---|---|---|---|---|
| Power | ○ | ○ | ○ | ○ | ○ | ○ | ○ | ○ |
| Sound | ○ |  |  | ○ | ○ |  |  |  |
| Illumination |  |  | ○ | ○ |  |  |  |  |
| Temperature |  |  |  |  |  |  | ○ | ○ |

In Table 1, a power control function may be the same or a common function among a mobile, a washing machine, electricity, a TV, a speaker, a robot cleaner, a refrigerator, and an air conditioner. As another example, a sound control function (or a volume control function) may be the same or a common function between a TV and a speaker. As another example, an illumination control function may be the same or a common function between a bulb and a TV. As another example, a temperature control function may be the same or a common function between a refrigerator and an air conditioner. However, Table 1 is merely an example, and the technical idea of the present disclosure may not be limited thereto.

According to an embodiment, second control information is information for controlling a function corresponding to at least one function of an application, from among first control information. The second control information may include an external device name (or external device identification (ID)), information associated with a function performed in an external device, control information associated with a function performed by an external device, information associated with a current state of an external device (or a current function control state of an external device), or the like. As another example, the second control information may include at least one of control information illustrated in FIG. 6. However, the present disclosure may not be limited thereto.

In operation 509, the electronic device 101 (e.g., the processor 120) controls the function of the at least one external device at least based on the determined control information of the external device obtained in operation 507.

For example, the electronic device 101 (e.g., the processor 120) may control a function of an external device corresponding to at least one function of an application executed in the electronic device 101, at least based on determined control information of the external device. According to an embodiment, the electronic device 101 (e.g., the processor 120) may display a UI for controlling a function of an external device corresponding to at least one function of an application, together with a UI for controlling the at least one function of the application executed in the electronic device 101 (e.g., the processor 120). The electronic device 101 (e.g., the processor 120) may control the function of the external device using the UI for controlling the function of the external device corresponding to the at least one function of the application. For example, when a video application is executed in the electronic device 101 (e.g., the processor 120), the electronic device 101 (e.g., the processor 120) may display a UI for controlling a volume control function of a speaker, together with a UI for controlling a volume control function of the electronic device 101. The electronic device 101 (e.g., the processor 120) may control the volume control function of the speaker using the UI for controlling the volume control function of the speaker. However, the present disclosure may not be limited thereto.

Hereinafter, with reference to FIGS. 8 to 18, a method will be described in which the electronic device 101 (e.g., the processor 120) controls a function of at least one external device corresponding to at least one function of an application executed in the electronic device 101 (e.g., the processor 120), at least based on determined control information of the external device.

Figure 8:
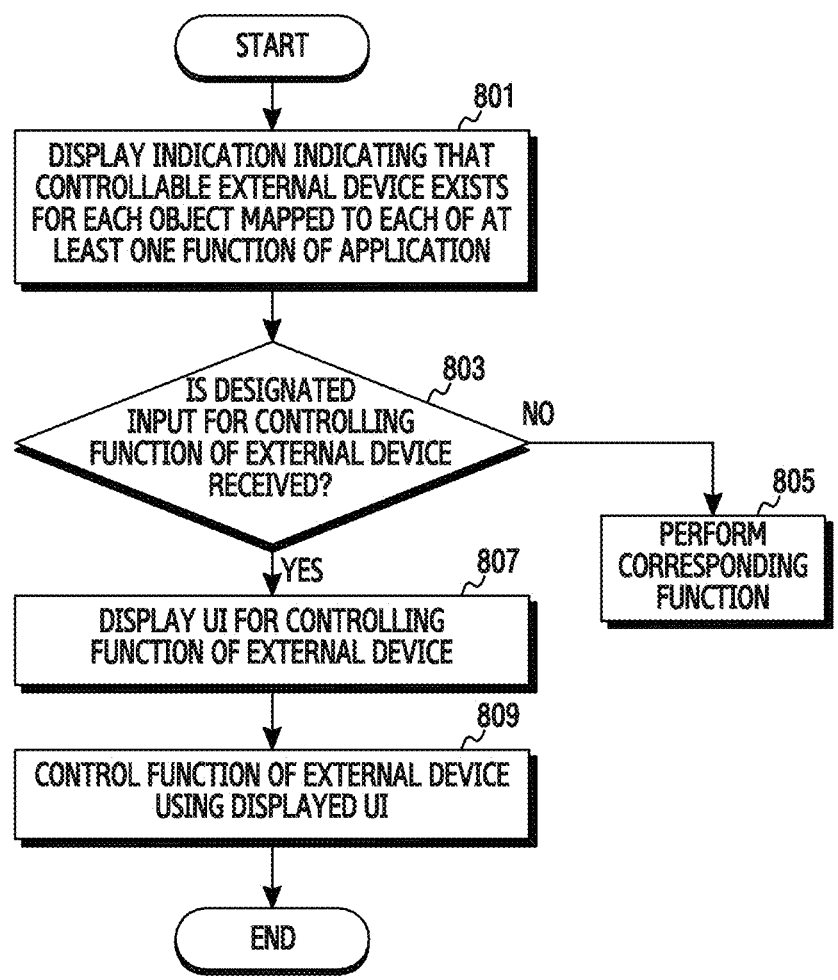
FIG. 8 illustrates a flowchart of a method in which an electronic device controls at least one function of an external device at least based on control information of the external device according to an embodiment of the present disclosure.

FIG. 8 illustrates a flowchart of a method in which an electronic device controls at least one function of an external device at least based on control information of the external device according to an embodiment of the present disclosure.

FIGS. 9A to 13B illustrate a method in which the electronic device 101 controls at least one function of an external device at least based on control information of the external device according to an embodiment of the present disclosure.

Referring to FIGS. 8 to 13B, the electronic device 101 (e.g., the processor 120) displays an indication indicating that a controllable external device (or control information of an external device) exists for each object mapped to each of at least one function of an executed application in operation 801. For example, the electronic device 101 (e.g., the processor 120) may determine an external device (that is, a controllable external device) that provides a function corresponding to at least one function of an executed application, and second control information of the external device, and may display an indication indicating that the determined controllable external device (or control information of the external device) exists for each object mapped to each of the at least one function of the executed application. According to an embodiment, the object may indicate an image or the like to which a function is mapped, such as an icon, an item, or the like. However, the present disclosure may not be limited thereto. According to an embodiment, the electronic device 101 (e.g., the processor 120) may display an indication indicating that determined controllable external device (or control information of the external device) exists, on a layer that is separated from a layer that displays an object mapped to at least one function of an application. However, the present disclosure may not be limited thereto.

Figures 9A, 9B, 9C, 9D:
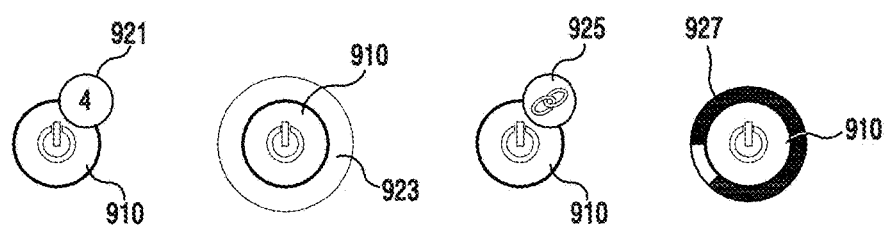

For example, when an application of the electronic device 101 is an application that provides a power control function (or a power on/off function), the electronic device 101 (e.g., the processor 120) may display an indication 921 in the shape of a badge indicating that a controllable external device exists, together with an object 910 (or a button) mapped to the power control function, and may display the number of controllable external devices (e.g., 4) in the indication in the shape of the badge, as illustrated in FIG. 9A. As another example, as illustrated in FIG. 9B, the electronic device 101 (e.g., the processor 120) may display (or output) an indication 923 (e.g., a neon effect) in the shape of a ring around a boundary of an object (or around an object), which indicates that a controllable external device exists, together with the object 910 (or button) mapped to the power control function. As another example, as illustrated in FIG. 9C, the electronic device 101 (e.g., the processor 120) may display an indication 925 in the shape of an operable icon badge indicating that a controllable external device exists, together with the object 910 (or button) mapped to the power control function. As another example, as illustrated in FIG. 9D, the electronic device 101 (e.g., the processor 120) may display an indication 927 in the shape of a move ring indicating that a controllable external device exists, together with the object 910 (or button) mapped to the power control function. In this instance, an example of indicating that a controllable external device (or control information of an external device) exists may not be limited to FIGS. 9A to 9D.

Referring again to FIG. 8, the electronic device 101 (e.g., the processor 120) determines whether a designated input for controlling a function of a controllable external device is received in operation 803.

According to an embodiment, the designated input for controlling the function of the external device may be distinguished (or independent) from an input for controlling at least one function of the application of the electronic device 101. For example, as illustrated in FIGS. 10A and 10B, in the state in which an object mapped to a power control function of an application executed in the electronic device 101 is displayed, when a single touch input (e.g., a single tap) with respect to the object is received from a user, the electronic device 101 may turn on or off the power of the electronic device 101, in view of controlling an original function of the power control function. As another example, when a long-touch input, which is greater than or equal to a designated threshold time, with respect to the object is received from a user, the electronic device 101 (e.g., the processor 120) may determine the long-touch input greater than or equal to the designated threshold time, as a designated input for controlling a function of an external device. However, the present disclosure may not be limited thereto. For example, the designated input for controlling a function of an external device may be set by a user.

When the electronic device 101 (e.g., the processor 120) determines that the designated input for controlling the function of the controllable external device is not received in operation 803, the electronic device 101 (e.g., the processor 120) may perform a corresponding function, for example, an original function of the at least one function of the application, based on a user input, or may continuously check a reception of the designated input for controlling the function of the controllable external device in operation 805. However, the present disclosure may not be limited thereto.

In operation 807, the electronic device 101 (e.g., the processor 120) displays a UI for controlling the function of the controllable external device.

According to an embodiment, when a designated input is received with respect to an object 1010 mapped to a power control function of an application as illustrated in FIG. 10A, the electronic device 101 (e.g., the processor 120) may display a UI for controlling a function of an external device, as illustrated in FIG. 10B.

For example, as illustrated in FIG. 10B, the electronic device 101 (e.g., the processor 120) may display objects indicating the external devices that provide a function corresponding to the power control function of the application, such as an object 1031 indicating a first illumination device, an object 1033 indicating a second illumination device, an object 1035 indicating a television, and an object 1037 indicating a washing machine, and may also display objects 1041 to 1047 for separately controlling the function of the external devices, to correspond to the objects indicating the external devices. As another example, the electronic device 101 (e.g., the processor 120) may further display an object 1020 (e.g., a master object) for uniformly (or simultaneously) controlling the function of controllable external devices. As another example, the electronic device 101 (e.g., the processor 120) may further display an object 1050 for controlling the original power control function of the electronic device 101 (e.g., the processor 120), together with an object indicating a controllable external device and an object for separately controlling a function of an external device. However, the present disclosure may not be limited thereto.

According to an embodiment, the electronic device 101 (e.g., the processor 120) may display a UI for controlling a function of an external device by reflecting a current state of an external device connected in communication.

For example, the electronic device 101 (e.g., the processor 120) may display a UI for controlling a function of a controllable external device, at least based on information obtained by reflecting (or updated with) a current state (or a current control state) of an external device connected in communication, such as a current volume state, whether power is turned on or off, a current illumination, a current temperature, or the like.

According to an embodiment, although not illustrated in FIGS. 10A and 10B, the electronic device 101 (e.g., the processor 120) may display that an external device is out of control in the state in which the external device is connected in communication with the electronic device 101. For example, when an external device is not operable due to a defect of the external device in the state in which the external device is connected in communication with the electronic device 101 (e.g., the processor 120), the electronic device 101 may determine that the external device is out of control, and may display that the external device is out of control. As another example, when the electronic device 101 (e.g., the processor 120) is not assigned with authority for controlling an external device, in the state in which the external device is connected in communication with the electronic device 101 (or when authentication of the external device is not performed), the electronic device 101 (e.g., the processor 120) may display that the external device is out of control. As another example, when a user sets an external device to be in a predetermined state that does not allow another device to control the external device, the electronic device 101 (e.g., the processor 120) may display that the external device is out of control. For example, when the mobile electronic device is set to a predetermined mode (e.g., a manner mode) by a user, the electronic device 101 (e.g., the processor 120) may display that the mobile electronic device 101 is out of control. As another example, when an air conditioner is set to a predetermined temperature (e.g., an optimal temperature set by a user) by a user, the electronic device 101 (e.g., the processor 120) may display that the air conditioner is out of control. However, an out-of-control state of an external device may not be limited to the above described example.

According to an embodiment, in the case of an application that provides a power control function, the electronic device 101 (e.g., the processor 120) may display an external device that is in a standby state (or a standby mode or an idle state). According to an embodiment, a standby state of an external device may include a state in which a main power of the external device is turned off and the external device is connected in communication with the electronic device 101 through an activated communication interface. As another example, a standby state of an external device may include a state in which a main power of the external device is turned off or on, the external device is connected in communication with the electronic device 101 through an activated communication interface, and the main power of the external device is capable of being turned on or off (or controlled to be on or off) by a control command (or a control signal) of the electronic device 101 (e.g., the processor 120). For example, as illustrated in FIG. 10B, when a washing machine is in a standby state, for example, when the washing machine is connected in communication with the electronic device 101 and the power is turned off, the electronic device 101 (e.g., the processor 120) may display, in a different color or the like, the object 1047 to which a function of controlling the washing machine is mapped, in order to distinguish the same from an object to which a function for controlling other external devices is mapped. However, the present disclosure may not be limited thereto.

Referring again to FIG. 8, the electronic device 101 (e.g., the processor 120) controls the function of the external device using the displayed UI in operation 809.

Referring to FIG. 10B, according to an embodiment, the electronic device 101 (e.g., the processor 120) may uniformly control external devices using an object 1020 (e.g., a master object) for uniformly (or simultaneously) controlling the function of the external devices. For example, in the case in which a function of an application is a power control function, when a user input with respect to the object 1020, for example, a power turn-on input with respect to the object 1020 is received, the electronic device 101 (e.g., the processor 120) may transmit a control signal to external devices so that the power of the external devices are all turned on. As another example, the electronic device 101 (e.g., the processor 120) may separately control a function of each external device at least based on a user input with respect to an object for separately controlling a function of an external device. For example, when a user input is received with respect to the object 1043 for controlling a power control function of a second illumination device that is in a turned-on state, the electronic device 101 (e.g., the processor 120) may transmit a control signal to the second illumination device so that the power of the second illumination device is switched from the turned-on state into a turned-off state. As another example, based on a user input with respect to an object for controlling the original function of the electronic device 101, the function of the electronic device 101 (e.g., the processor 120) may be controlled. For example, when a user input is received with respect to the object 1050 for controlling the power control function of the electronic device 101, the electronic device 101 (e.g., the processor 120) may turn on or off the power of the electronic device 101 at least based on the user input.

Although FIG. 10B illustrates that the electronic device 101 displays all of the object 1020 (e.g., a master object) for uniformly (or simultaneously) controlling a corresponding function of external devices, the objects 1041 to 1047 for separately controlling a corresponding function of external devices, and the object 1050 for controlling the original function of the electronic device 101, the present disclosure may not be limited thereto. For example, the electronic device 101 may display at least one out of: the object 1020 (e.g., a master object) for uniformly (or simultaneously) controlling a corresponding function of external devices, the objects 1041 to 1047 for separately controlling a corresponding function of external devices, and the object 1050 for controlling the original function of the electronic device 101, the present disclosure may not be limited thereto.

Although FIG. 10B illustrates an object that is toggled based on the turning on or off of the power of an external device when a user input is received with respect to the object to which a control function of the external device is mapped, in order to describe the power control function of the application, for example, a power on/off function. However, the present disclosure may not be limited thereto.

Figure 11A:
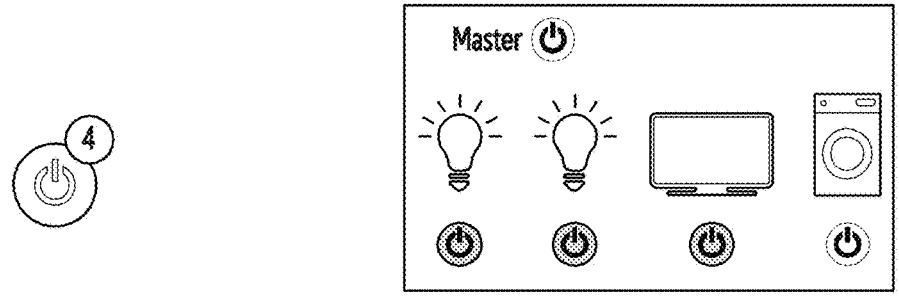
Figure 11B:
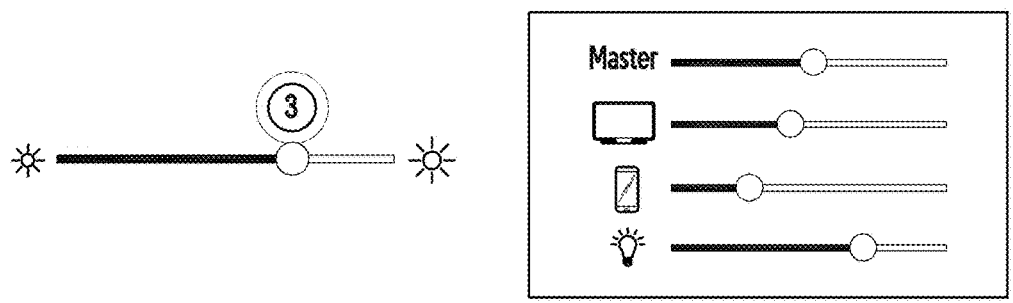
Figure 11C:
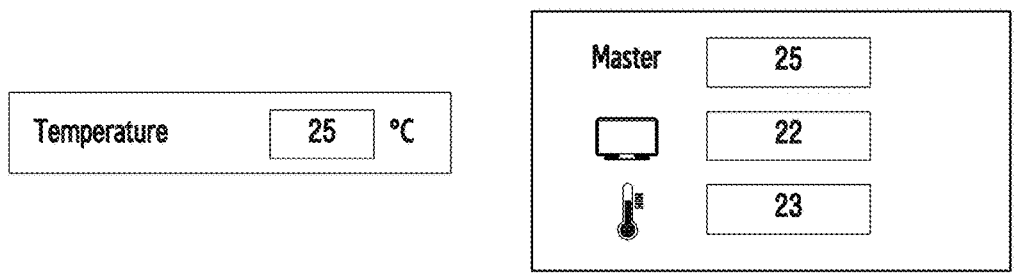

For example, the object mapped to the control function of the external device may be displayed in the shape of a toggle as illustrated in FIG. 11A, may be displayed in the shape of a slider bar as illustrated in FIG. 11B, or may be displayed in the shape of an input box as illustrated in FIG. 11C. However, the present disclosure may not be limited thereto.

According to an embodiment, as illustrated in FIGS. 11A to 11C, the electronic device 101 (e.g., the processor 120) may display an object mapped to a control function of an external device in various shapes, according to a function of the application (or an attribute of the function of the application). For example, when two modes (or states) such as an on-state and an off-state are controlled, an object mapped to a control function of an external device may be displayed in the shape of a toggle as illustrated in FIG. 11A. As another example, when a function is controlled in a predetermined range such as the brightness of a screen or a volume, an object mapped to a control function of an external device may be displayed in the shape of a slider bar as illustrated in FIG. 11B. The electronic device 101 (e.g., the processor 120) may control the function of the external device based on a touch input (e.g., a drag input) with respect to a slider located on the slider bar. As another example, when a function requires the inputting of a control value irrespective of a designated range, such as a temperature, an object mapped to a control function of an external device may be displayed in the shape of an input box as illustrated in FIG. 11C, and may receive a control value from a user. However, the present disclosure may not be limited thereto.

According to an embodiment, the electronic device 101 (e.g., the processor 120) may absolutely or relatively control a function of at least one external device using an object (e.g., a master object) for uniformly (or simultaneously) controlling a function of a controllable external device.

Figure 12A:
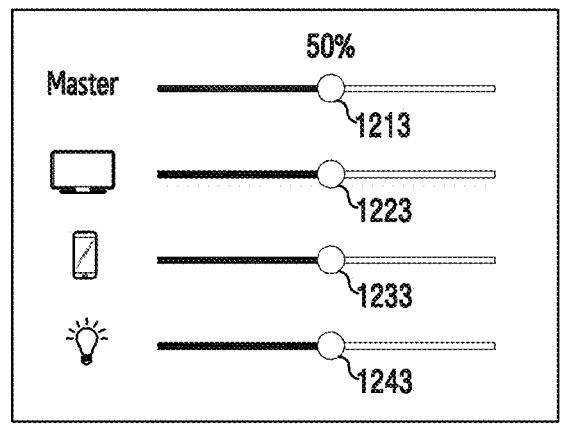
Figure 12B:
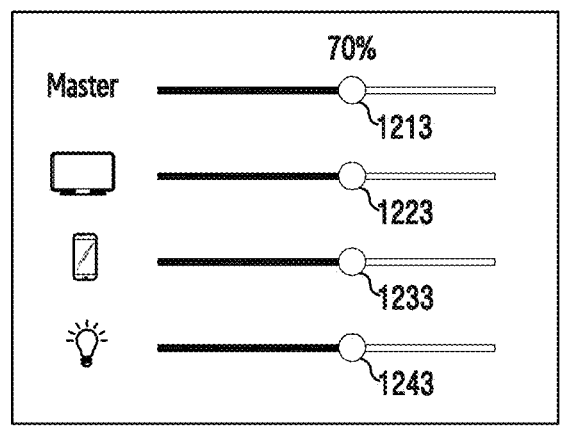

For example, FIGS. 12A and 12B illustrate an example in which the electronic device 101 absolutely controls a function of at least one external device. For example, in the case in which a function of an application is a brightness control function, and the brightness control function is embodied in the shape of a slider bar, when a slider 1213 of a master object is moved to a location corresponding to a 50% level of the brightness by a user input, the brightness level of at least one external device may be adjusted to a 50% level, and a slider 1223 to 1243 for a brightness control function of the at least one external device is also uniformly moved to a location corresponding to a 50% level, as illustrated in FIG. 12A. As another example, when the slider 1213 of the master object is moved to a location corresponding to a 70% level of the brightness by a user input, the brightness level of at least one external device may be adjusted to a 70% level, and the slider 1223 to 1243 for a brightness control function of the at least one external device is also uniformly moved to a location corresponding to a 70% level, as illustrated in FIG. 12B.

Figure 13A:
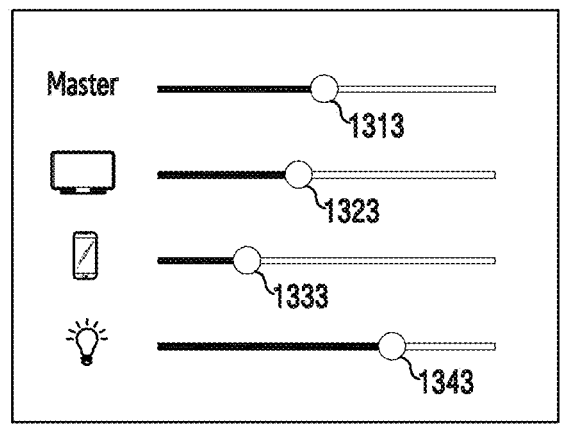
Figure 13B:
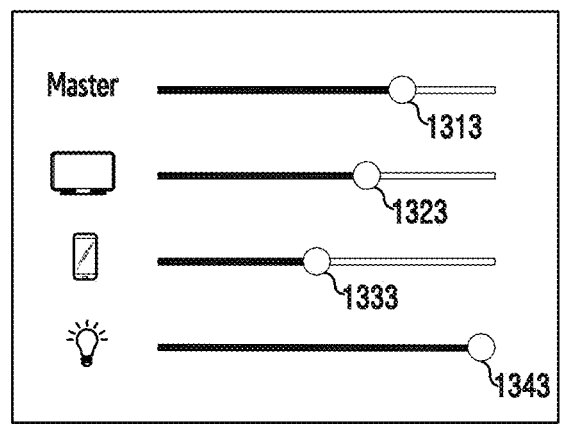

For example, FIGS. 13A and 13B illustrate an example in which the electronic device 101 relatively controls a function of at least one external device. For example, a function of an application is a brightness control function, and the brightness control function is embodied in the shape of a slider bar. Also, the current location of a slider 1313 of a master object of the electronic device 101 and the current location of a slider 1323 to 1343 of an object for controlling a function of at least one external device are assumed to be 100%, in FIG. 13A. When the location of the slider 1313 of the master object is moved to the right by 25% from the current location, the electronic device 101 (e.g., the processor 120) may move the location of a slider 1323 to 1343 of an object for controlling the function of the at least one external device by a distance corresponding to 25% from the current location of each object, as illustrated in FIG. 13B. According to an embodiment, when controlling based on the control of the master object slider 1313 exceeds a control range of a slider of each object, for example, when the slider 1343 of an object for controlling the brightness of an illumination device is not capable of moving any longer to the right as illustrated in FIG. 13B, the electronic device 101 (e.g., the processor 120) may determine that the brightness reaches a maximum brightness level, and may stop the movement of the slider 1343 of the object. However, the present disclosure may not be limited thereto.

Although FIGS. 12A to 13B illustrate a brightness control function of an application, the present disclosure may not be limited thereto. For example, a function of an application that may be embodied in the shape of a slider, such as a volume control function or the like, may be equivalently applied.

FIGS. 14A to 14D illustrate a method of controlling a function according to an embodiment of the present disclosure. For example, FIGS. 14A to 14D illustrate an example in which the electronic device 101 (e.g., the processor 120) controls a power control function of an external device that provides a function corresponding to a power control function of the electronic device 101, when executing an application that provides the power control function.

Figures 14A, 14B, 14C:
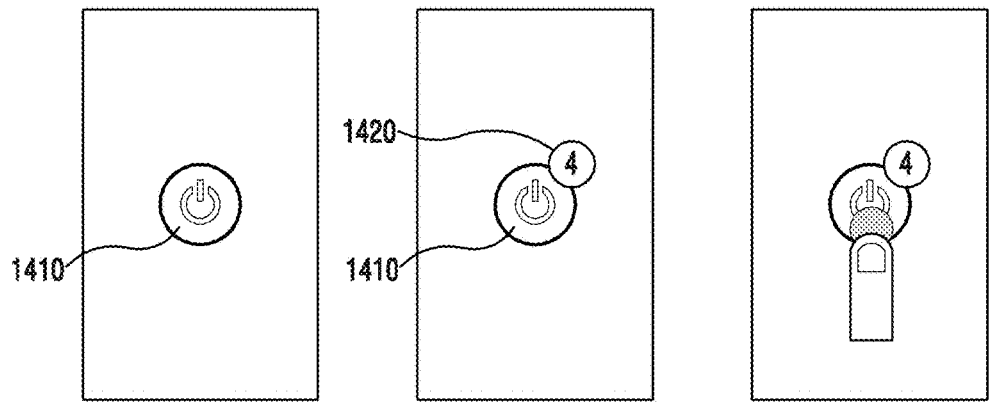
FIGS. 14A to 14D illustrate a method of controlling a function according to an embodiment of the present disclosure.

According to an embodiment, in FIG. 14A, when a user input is received with respect to an object to which a power control function is mapped, the electronic device 101 (e.g., the processor 120) may determine an external device that provides a function corresponding to the power control function, and may determine control information for controlling the function of the external device corresponding to at least one function of the application. Based on the determined external device and control information of the external device, the electronic device 101 (e.g., the processor 120), may display an indication 1420 in the shape of a badge indicating that a controllable external device exists, together with an object 1410 to which the power control function is mapped, wherein the number of controllable external devices (e.g., 4) may be displayed in the indication provided in the shape of a badge, as illustrated in FIG. 14B.

Figure 14D:
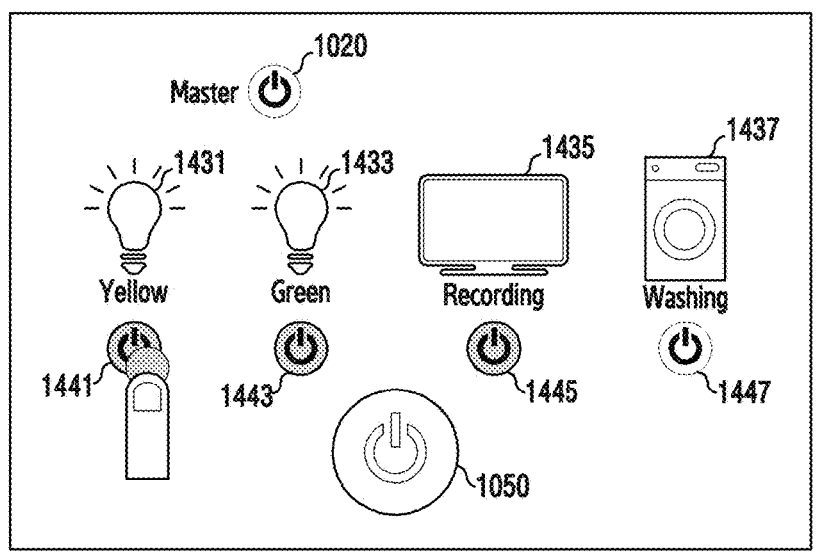

According to an embodiment, when a designated input (e.g., a long-touch input) is received with respect to the object 1410 to which the power control function is mapped, as illustrated in FIG. 14C, the electronic device 101 (e.g., the processor 120) may display objects indicating external devices that provide a function corresponding to the power control function, for example, an object 1431 indicating a first illumination device, an object 1433 indicating a second illumination device, an object 1435 indicating a television, and an object 1437 indicating a washing machine, and may also display objects 1441 to 1447 for separately controlling the corresponding function of the external devices to correspond to the objects indicating the external devices, as illustrated in FIG. 14D. As another example, the electronic device 101 (e.g., the processor 120) may further display an object 1420 (e.g., a master object) for uniformly (or simultaneously) controlling a corresponding function of controllable external devices. As another example, the electronic device 101 (e.g., the processor 120) may further display an object 1450 for controlling the original power control function of the electronic device 101, together with an object indicating a controllable external device and an object for separately controlling a function of an external device. However, the present disclosure may not be limited thereto.

According to an embodiment, as illustrated in FIG. 14D, when a user input with respect to an object 1441 for controlling a power control function of a first illumination device is received, the power of the first illumination device that is mapped to the object 1441 may be turned on or off.

Although not illustrated in FIGS. 14A to 14D, for example, the electronic device 101 (e.g., the processor 120) may receive a user input with respect to the master object 1420, and may uniformly turn on or off the power of external devices. As another example, when a user input is received with respect to the object 1450 for controlling the original power control function of the electronic device 101, the electronic device 101 (e.g., the processor 120) may turn on or off only the power of the electronic device 101 (e.g., the processor 120). However, the present disclosure may not be limited thereto.

FIGS. 15A to 15D illustrate a method of controlling a function according to another embodiment of the present disclosure. For example, FIGS. 15A to 15D illustrate an example in which the electronic device 101 (e.g., the processor 120) controls a brightness control function of an external device that provides a function corresponding to a brightness control function of the electronic device 101, when executing an application that provides the brightness control function.

Figures 15A, 15B, 15C:
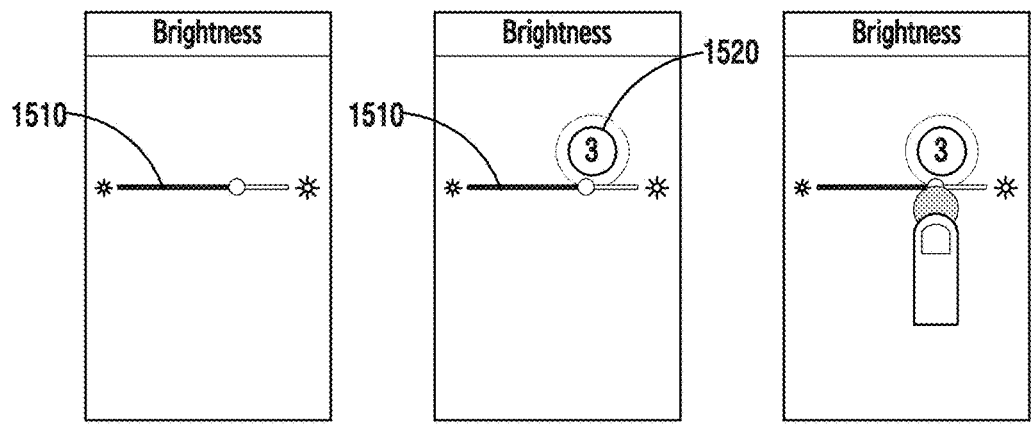
FIGS. 15A to 15D illustrate a method of controlling a function according to another embodiment of the present disclosure.

According to an embodiment, in FIG. 15A, when a user input is received with respect to an object to which a brightness control function is mapped, the electronic device 101 (e.g., the processor 120) may determine an external device that provides a function corresponding to the brightness control function, and control information for controlling the function of the external device corresponding to at least one function of an executed application. Based on the determined external device and control information of the external device, the electronic device 101 (e.g., the processor 120) may display an indication 1520 in the shape of a badge indicating that a controllable external device exists, together with an object 1510 to which the brightness control function is mapped, wherein the number of controllable external devices (e.g., 3) may be displayed in the indication 1520 provided in the shape of a badge, as illustrated in FIG. 15B.

Figure 15D:
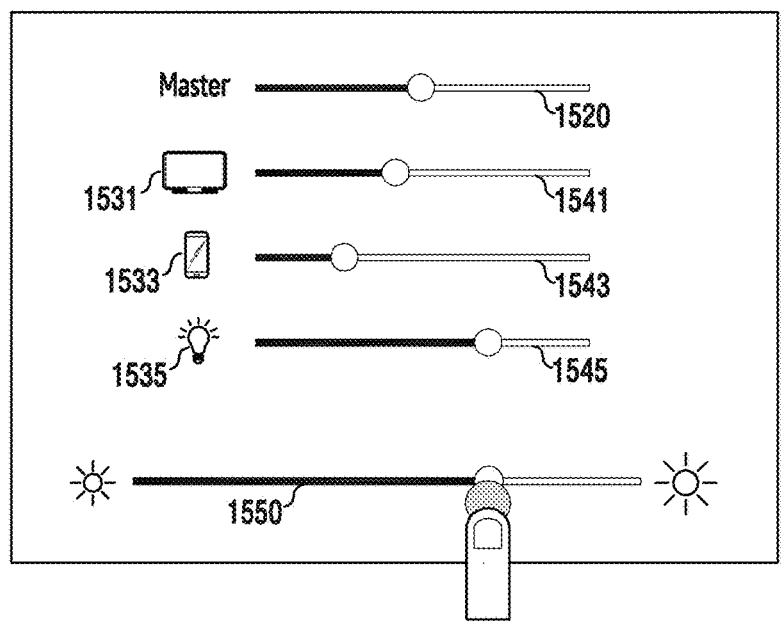

According to an embodiment, when a designated input (e.g., a long-touch input) is received with respect to the object 1510 to which the brightness control function is mapped, as illustrated in FIG. 15C, the electronic device 101 (e.g., the processor 120) may display objects indicating external devices that provide a function corresponding to the brightness control function, for example, an object 1531 indicating a television, an object 1533 indicating a mobile terminal, and an object 1535 indicating an illumination device, and may also display objects 1541 to 1545 for separately controlling the function of the external devices to correspond to the objects indicating the external devices, as illustrated in FIG. 15D. As another example, the electronic device 101 (e.g., the processor 120) may further display an object 1520 (e.g., a master object) for uniformly (or simultaneously) controlling a corresponding function of controllable external devices. As another example, the electronic device 101 (e.g., the processor 120) may further display an object 1550 for controlling the original brightness control function of the electronic device 101 together with an object indicating a controllable external device and an object for separately controlling a function of an external device. However, the present disclosure may not be limited thereto.

According to an embodiment, as illustrated in FIG. 15D, when a user input is received with respect to the object 1550 for controlling the brightness control function of the electronic device 101 (e.g., the processor 120), only the brightness of the electronic device 101 may be controlled.

Although not illustrated in FIGS. 15A to 15D, for example, the electronic device 101 (e.g., the processor 120) may receive a user input with respect to the master object 1520, and may uniformly control the brightness of external devices. As another example, the electronic device 101 (e.g., the processor 120) may receive a user input with respect to objects 1531 to 1535 for separately controlling the brightness of external devices, and may separately control the brightness of the external devices. However, the present disclosure may not be limited thereto.

FIGS. 16A to 16D illustrate a method of controlling a function according to another embodiment of the present disclosure. For example, FIGS. 16A to 16D illustrate an example in which the electronic device 101 (e.g., the processor 120) controls a muting function of an external device that provides a function corresponding to a muting function of the electronic device 101 when an application that provides the muting function is executed.

Figure 16A:
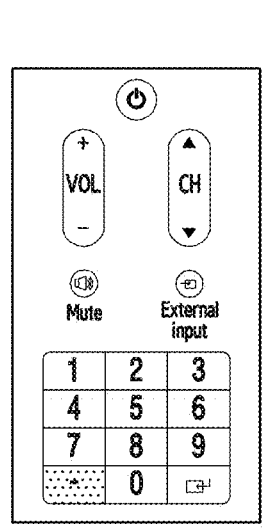
FIGS. 16A to 16D illustrate a method of controlling a function according to another embodiment of the present disclosure.
Figure 16B:
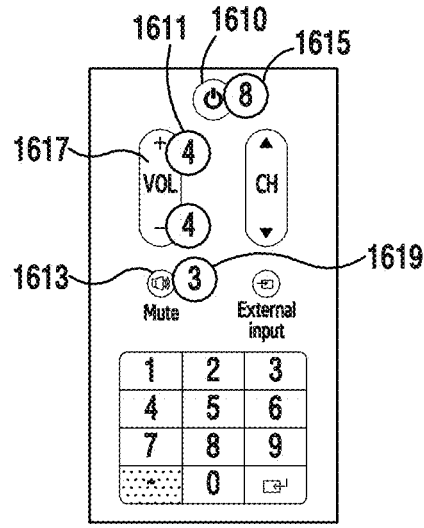

According to an embodiment, in FIG. 16A, the electronic device 101 (e.g., the processor 120) executes a broadcasting application, and may display a UI including a plurality of objects for controlling broadcasting data. According to an embodiment, when the broadcasting application is executed, the electronic device 101 may determine an external device that provides a function corresponding to at least one function of the broadcasting application, for example, a volume control function, a power control function, and a muting function, and control information for controlling a function of the external device corresponding to the at least one function of the executed application, as illustrated in FIG. 16B. Based on the determined external device and control information of the external device, the electronic device 101 (e.g., the processor 120) may display an indication 1615 to 1619 in the shape of a badge, indicating that a controllable external device exists, with respect to each of an object 1611 to which a volume control function is mapped, an object 1610 to which a power control function is mapped, an object 1613 to which a muting function is mapped, wherein the number of controllable external devices may be displayed in the indication 1615 to 1619 in the shape of a badge (for example, 4 for the object 1611 to which the volume control function is mapped, 8 for the object 1610 to which the power control function is mapped, and 3 for the object 1613 to which muting function is mapped), as illustrated in FIG. 16B.

Figure 16C:
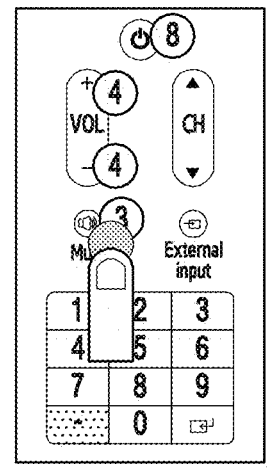
Figure 16D:
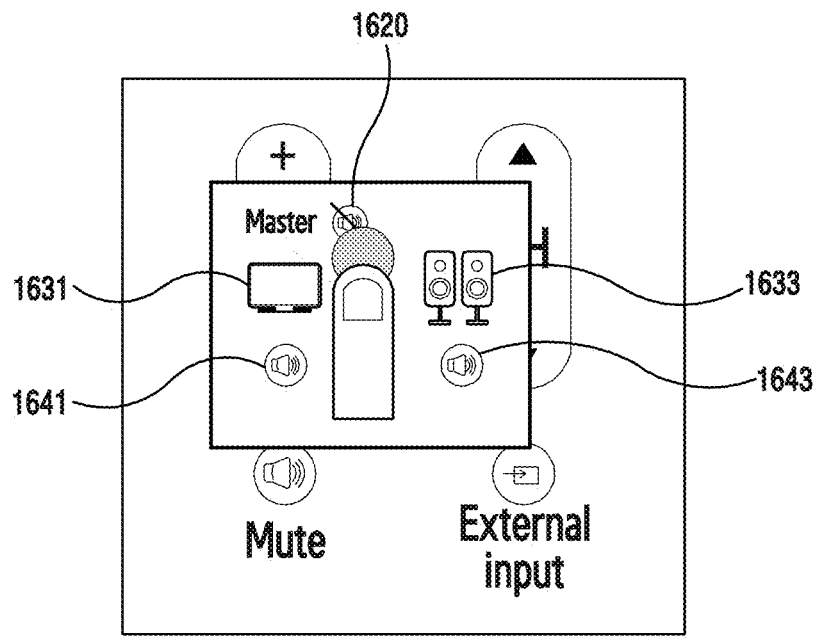

According to an embodiment, when a designated input (e.g., a long-touch input) is received with respect to the object 1613 to which the muting function is mapped, as illustrated in FIG. 16C, the electronic device 101 (e.g., the processor 120) may display objects indicating external devices that provide a function corresponding to the muting function, for example, an object 1631 indicating a television and an object 1633 indicating a speaker, and may also display objects 1641 to 1643 for separately controlling the muting function of the external devices to correspond to the objects indicating the external devices, as illustrated in FIG. 16D. As another example, the electronic device 101 (e.g., the processor 120) may further display an object 1620 (e.g., a master object) for uniformly (or simultaneously) controlling a corresponding function of controllable external devices. Although not illustrated in FIGS. 16A to 16D, the electronic device 101 (e.g., the processor 120) may further display an object for controlling the original muting function of the electronic device 101, together with an object indicating a controllable external device and an object for separately controlling a function of an external device. However, the present disclosure may not be limited thereto.

According to an embodiment, as illustrated in FIG. 16D, when a user input is received with respect to the master object 1620, the sound of the external devices are uniformly muted or the muting state of them may be canceled.

Although not illustrated in FIGS. 16A to 16D, for example, the electronic device 101 (e.g., the processor 120) may receive a user input with respect to the object for controlling the muting function of the electronic device 101, and may uniformly control the muting function of the external devices. As another example, the electronic device 101 (e.g., the processor 120) may receive a user input with respect to an object for separately controlling the muting function of an external device, and may separately control the muting function of the external device. However, the present disclosure may not be limited thereto.

FIGS. 17A to 17D illustrate a method of controlling a function according to another embodiment of the present disclosure. For example, FIGS. 17A to 17D illustrate an example in which the electronic device 101 (e.g., the processor 120) controls a music playback function of an external device that provides a function corresponding to a music playback function of the electronic device 101 when an application that provides the music playback function is executed.

Figure 17A:
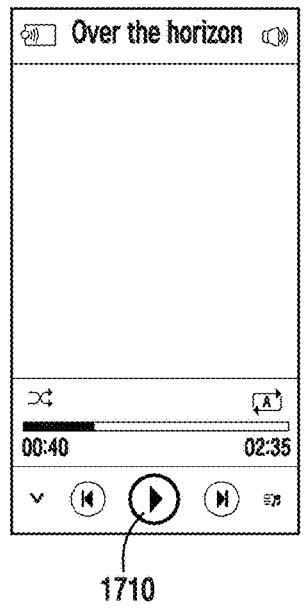
FIGS. 17A to 17D illustrate a method of controlling a function according to another embodiment of the present disclosure.
Figure 17B:
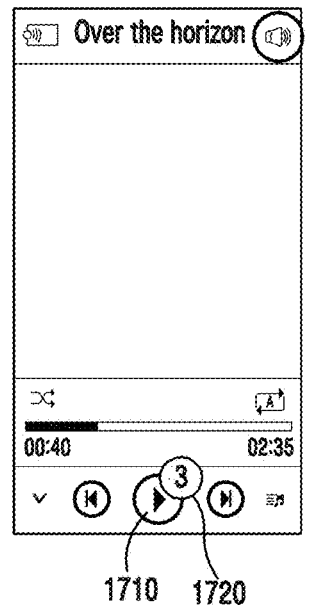

According to an embodiment, in FIG. 17A, the electronic device 101 (e.g., the processor 120) executes a music application, and may display a UI including a plurality of objects for controlling music data. According to an embodiment, when a music application is executed, the electronic device 101 may determine an external device that provides a function corresponding to at least one function of the music application, for example, a music playback function, and control information for controlling the music playback function of the external device corresponding to the music playback function of the executed music application, as illustrated in FIG. 17B. Based on the determined external device and control information of the external device, the electronic device 101 (e.g., the processor 120), may display an indication 1720 in the shape of a badge indicating that a controllable external device exists with respect to an object 1710 to which the music playback function is mapped, wherein the number of controllable external devices (e.g., 3) may be displayed in the indication 1720 provided in the shape of a badge, as illustrated in FIG. 17B.

Figure 17C:
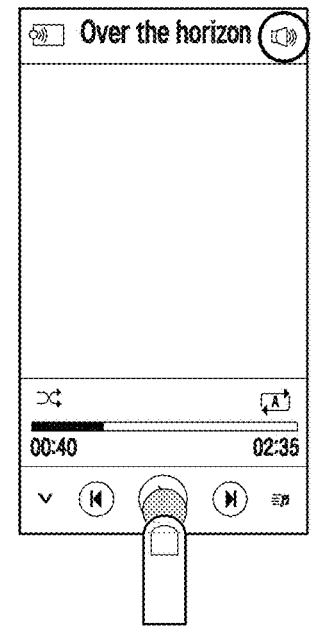
Figure 17D:
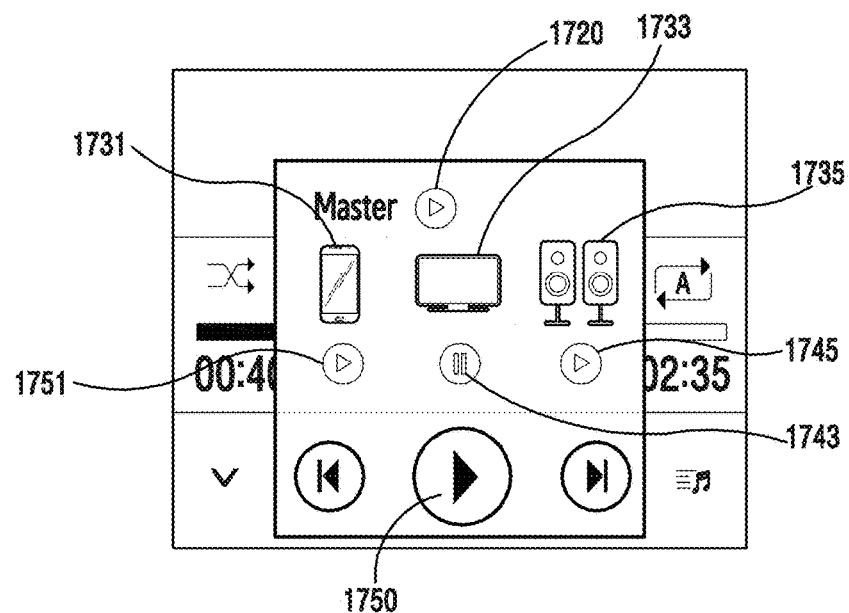

According to an embodiment, when a designated input (e.g., a long-touch input) is received with respect to the object 1710 to which the music playback function is mapped, as illustrated in FIG. 17C, the electronic device 101 (e.g., the processor 120) may display objects indicating external devices that provide a function corresponding to the music playback function, for example, an object 1731 indicating a mobile electronic device, an object 1733 indicating a display that may reproduce a VOD, and an object 1735 indicating a speaker, and may also display objects 1741 to 1745 for separately controlling the function of the external devices to correspond to the objects indicating the external devices, as illustrated in FIG. 17D. As another example, the electronic device 101 (e.g., the processor 120) may further display an object 1720 (e.g., a master object) for uniformly (or simultaneously) controlling a corresponding function of controllable external devices. As another example, the electronic device 101 (e.g., the processor 120) may further display an object 1750 for controlling the original music playback function of the electronic device 101, together with an object indicating a controllable external device and an object for separately controlling a function of an external device. However, the present disclosure may not be limited thereto.

According to an embodiment, as illustrated in FIG. 17D, when a user input is received with respect to the object 1750 for controlling the original music playback function of the electronic device 101, the playback of music of the electronic device 101 (e.g., the processor 120) may be paused, or may again play back the paused playback of music.

Although not illustrated in FIGS. 17A to 17D, for example, the electronic device 101 (e.g., the processor 120) may receive a user input with respect to the master object 1710, and may uniformly control the music playback function of external devices. As another example, the electronic device 101 (e.g., the processor 120) may receive a user input with respect to objects 1741 to 1745 for separately controlling the music playback function of external devices, and may separately control the music playback function of the external devices. However, the present disclosure may not be limited thereto.

Figure 18:
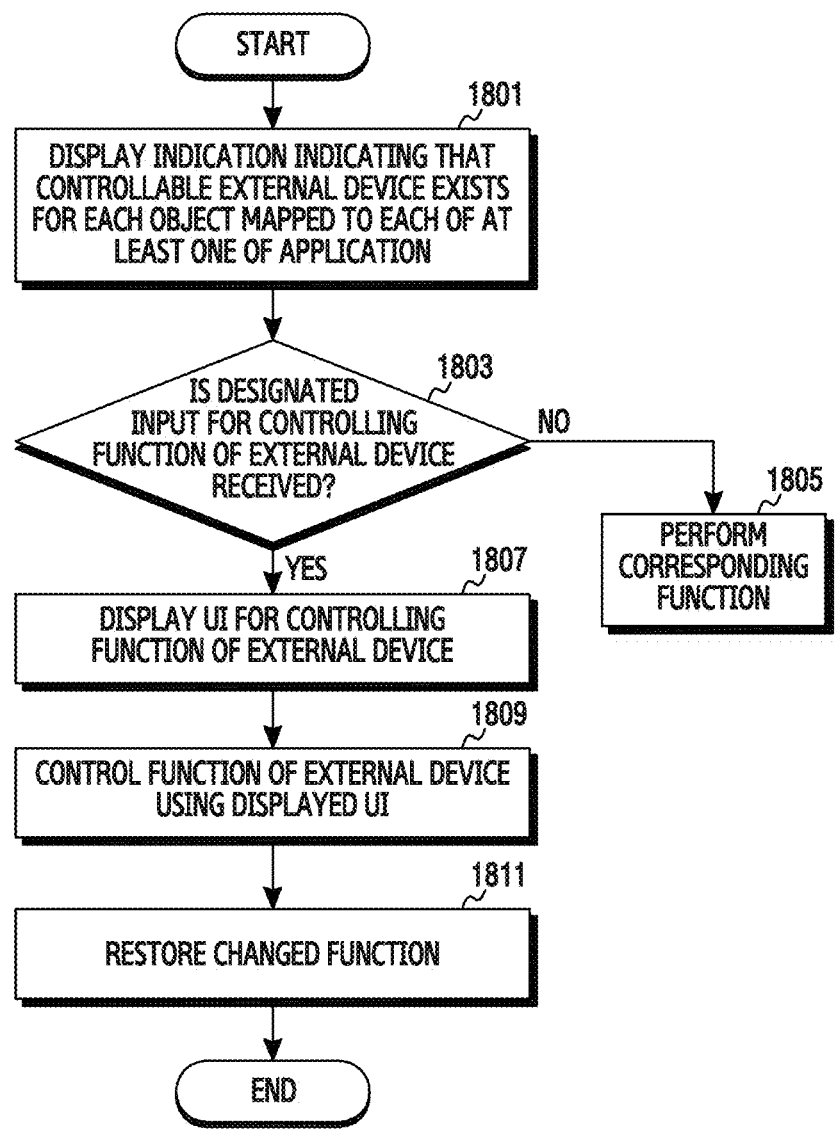
FIG. 18 illustrates a flowchart of a method in which an electronic device controls at least one function of an external device at least based on control information of the external device according to another embodiment of the present disclosure.

FIG. 18 illustrates a flowchart of a method in which the electronic device 101 (e.g., the processor 120) controls at least one function of an external device at least based on control information of the external device according to another embodiment of the present disclosure.

According to an embodiment, operations 1801 to 1809 of FIG. 18 are the same as or similar to operations 801 to 809 of FIG. 8, respectively, and thus, detailed descriptions thereof will be omitted.

According to an embodiment, in operation 1811, the electronic device 101 (e.g., the processor 120) may restore a function of an external device that has been changed (or controlled) by the control of the electronic device 101. For example, the electronic device 101 (e.g., the processor 120) may restore, based on a user input (or a user selection input), a function of an external device that has been changed (or controlled) by the control of the electronic device 101. As another example, the electronic device 101 (e.g., the processor 120) may maintain, based on a user input (or a user selection input), a function of an external device that has been changed (or controlled) by the control of the electronic device 101.

According to an embodiment, the electronic device 101 (e.g., the processor 120) may restore a function of an external device that has been changed (or controlled) by the control of the electronic device 101 when a communication connection with the external device is disconnected. According to another embodiment, the electronic device 101 (e.g., the processor 120) may restore a function of an external device that has been changed (or controlled) by the control of the electronic device 101 when an executed application is terminated. According to another embodiment, based on settings (e.g., user settings) of an external device, a function of the external device that has been changed (or controlled) by the control of the electronic device 101 may be restored.

According to an embodiment, the electronic device 101 (e.g., the processor 120) may determine a restoration point so as to restore a function of an external device that has been changed (or controlled) by the control of the electronic device 101. For example, the electronic device 101 (e.g., the processor 120) may restore the function of the external device to the state of the external device at a point of connecting communication with the external device. As another example, the electronic device 101 (e.g., the processor 120) may restore the function of the external device to the state of the external device at a point of executing an application. However, the present disclosure may not be limited thereto. For example, the electronic device 101 (e.g., the processor 120) may restore a function of an external device that has been changed (or controlled) by the control of the electronic device 101 to the state of the external device at a point selected by the user.

According to various embodiments of the present disclosure, a method of controlling a function by an electronic device may include: receiving first control information for controlling a function of at least one first external device, from the at least one first external device connected in communication using a communication interface; executing, by the electronic device, an application that provides at least one function; determining, from the at least one first external device, information associated with at least one second external device that provides a function corresponding to the at least one function of the application, and determining, from the first control information, second control information for controlling the corresponding function of the at least one second external device; and controlling, by the electronic device, the corresponding function of the at least one second external device at least based on the determined second control information.

According to an embodiment, when the application is executed, the method may further include searching for at least one third external device that is capable of being additionally connected when the application is executed; and receiving, from the at least one third external device, control information for controlling a function of the at least one third external device when a communication connection with the at least one third external device is established.

According to an embodiment, the controlling of the corresponding function of the at least one second external device by the electronic device may further include: displaying an object mapped to each of the at least one function of the application; and displaying an indication indicating that the at least one second external device and the corresponding function of the at least one second external device exist, for each object mapped to each of the at least one function of the application.

According to an embodiment, the displaying of an indication indicating that the at least one second external device and the corresponding function of the at least one second external device exist may further include: additionally displaying the number of the at least one second external devices.

According to an embodiment, the method may further include: receiving a designated input for controlling the corresponding function of the at least one second external device, with respect to the mapped object, wherein a user interface is used for controlling the corresponding function of the at least one second external device when the designated input is received.

According to an embodiment, the user interface for controlling the corresponding function of the at least one second external device may include at least one out of: an object for controlling a function of the electronic device, an object for separately controlling the corresponding function of the at least one second external device, and an object for uniformly controlling the corresponding function of the at least one second external device.

According to an embodiment, the user interface for controlling the corresponding function of the at least one second external device may include: an object displayed in the shape of a toggle, an object displayed in the shape of a slider bar, or an input box, according to an attribute of the corresponding function.

According to an embodiment, the at least one function may include at least one of a power control function, a volume control function, a brightness control function, an illumination control function, a temperature control function, and a music playback function.

According to an embodiment, when the communication connection with the at least one second external device is disconnected, the method may further include: restoring a control state of the corresponding function of the at least one second external device to a control state before the establishment of the communication connection.

According to various embodiments of the present disclosure, a method of controlling a function and an electronic device supporting the same may control a function of an external device that provides a function that is in common with at least one function of an executed application when the application is executed, at least based on profile information of the at least one external device that connects communication with the electronic device.

Also, a structure of data used in the above described embodiments of the present disclosure may be recorded in a computer readable recording medium by various means. The computer readable recording medium may include a storage medium, such as a magnetic storage medium (e.g., ROM, floppy disk, hard disk, etc.), an optical reading medium (e.g., CD-ROM, DVD, etc.), or the like.

According to an embodiment, a storage medium that stores instructions is configured to enable at least one processor to perform at least one operation when the instructions are executed by the at least one processor, and may include a computer readable storage device recording a program for implementing the operation, the at least one operation, performed in an electronic device including a communication interface and a processor, including: receiving first control information for controlling a function of at least one first external device from the at least one first external device connected in communication using a communication interface; executing, by the electronic device, an application that provides at least one function; determining, from the at least one first external device, information associated with at least one second external device that provides a function corresponding to the at least one function of the application, and determining, from the first control information, second control information for controlling the corresponding function of the at least one second external device; and controlling, by the electronic device, the corresponding function of the at least one second external device at least based on the determined second control information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of controlling a function by an electronic device, the method comprising:
   receiving, by the electronic device, an input on a first object of an application;
   displaying, by the electronic device, based on the input, a second object and a third object through a display of the electronic device, the second object being an object for separately controlling at least one function of at least one first external device, the third object being an object for controlling the function of the application and the at least one function of the at least one first external device at once; and
   controlling at least one of the function of the application or at least one function of the at least one first external device, based on an input on the second object or the third object.

2. The method of claim 1, wherein the at least one function of the at least one first external device is identical to the function of the application.

3. The method of claim 1, further comprising:
   searching at least one second external device that is capable of being additionally connected when the application is executed; and
   receiving, from the at least one second external device, information associated with at least one function of the at least one second external device when a communication connection with the at least one second external device is established.

4. The method of claim 1, function comprises:
   displaying, with the first object mapped to the function of the application, an indication indicating that the at least one function of the at least one first external device exists.

5. The method of claim 4, wherein displaying the indication further comprises displaying a number of the at least one first external device.

6. The method of claim 1, further comprising:
   receiving information associated with at least one function of at least one third external device from the at least one third external device which is connected with the electronic device using a communication interface of the electronic device;
   executing, by the electronic device, the application among a plurality of applications of the electronic device; and
   identifying, by the electronic device, the at least one first external device among the at least one third external device, wherein at least one function of the at least one first external device corresponds to the function of the application.

7. The method of claim 1, further comprising:
   when the input on the first object is a first input, executing the function of the application; and
   when the input on the first object is a second input, displaying the second object and the third object.

8. The method of claim 1, wherein at least one of the first object, the second object, or the third object is displayed in a form of at least one of a toggle, a slider bar, or an input box according to an attribute of the at least one function of the at least one first external device.

9. The method of claim 1, wherein the function of the application includes at least one of a power control function, a volume control function, a brightness control function, an illumination control function, a temperature control function, or a music playback function.

10. The method of claim 1, further comprising, when a communication connection with the at least one first external device is disconnected, restoring a control state of the at least one function of the at least one first external device to a control state before establishing the communication connection.

11. An electronic device for controlling a function, comprising:
    a communication interface;
    a display; and
    a processor operably connected to the communication interface and the display, the processor configured to:
      receive an input on a first object of an application;
      control the display to display, based on the input, a second object and a third object, the second object being an object for separately controlling at least one function of at least one first external device, the third object being an object for controlling the function of the application and the at least one function of the at least one first external device at once; and
      control at least one of the function of the application or at least one function of the at least one first external device, based on an input on the second object or the third object.

12. The electronic device of claim 11, wherein the at least one function of the at least one first external device is identical to function of the application.

13. The electronic device of claim 11, wherein the processor is configured to:
    search at least one second external device that is capable of being additionally connected when the application is executed using the communication interface; and
    receive, from the at least one second external device, information associated with at least one function of the at least one second external device when a communication connection with the at least one second external device is established.

14. The electronic device of claim 11,
    wherein the processor is further configured to control the display to
    display, with the first object mapped to the function of the application, an indication indicating that the at least one function of the at least one first external device exists.

15. The electronic device of claim 14, wherein the processor is further configured to control the display to display a number of the at least one first external device.

16. The electronic device of claim 11, wherein the processor is further configured to:
    receive information associated with at least one function of at least one third external device from the at least one third external device which is connected with the electronic device using the communication interface;
    execute the application among a plurality of applications of the electronic device; and
    identify the at least one first external device among the at least one third external device, wherein at least one function of the at least one first external device corresponds to the function of the application.

17. The electronic device of claim 11, wherein the processor is further configured to:
    when the input on the first object is a first input, execute the function of the application; and
    when the input on the first object is a second input, control the display to display the second object and the third object.

18. The electronic device of claim 11, at least one of the first object, the second object, or the third object is displayed in a form of at least one of a toggle, a slider bar, or an input box according to an attribute of the at least one function of the at least one first external device.

19. The electronic device of claim 11, wherein the function of the application comprises at least one of a power control function, a volume control function, a brightness control function, an illumination control function, a temperature control function, or a music playback function.

20. The electronic device of claim 11, wherein the processor is further configured to restore a control state of the at least one function of the at least one first external device to a control state before establishing a communication connection when the communication connection with the at least one first external device is disconnected.

\* \* \* \* \*